United States Patent
Jain

(10) Patent No.: US 10,740,903 B2
(45) Date of Patent: Aug. 11, 2020

(54) EDGE DETECTION USING FUZZY GRADIENT INFORMATION

(71) Applicant: Adobe Inc., San Jose, CA (US)

(72) Inventor: Somya Jain, New Delhi (IN)

(73) Assignee: ADOBE INC., San Jose, CA (US)

(*) Notice: Subject to any disclaimer, the term of this patent is extended or adjusted under 35 U.S.C. 154(b) by 187 days.

(21) Appl. No.: 16/038,870

(22) Filed: Jul. 18, 2018

(65) Prior Publication Data

US 2020/0027214 A1    Jan. 23, 2020

(51) Int. Cl.
*G06T 5/00* (2006.01)
*G06T 7/13* (2017.01)
*G06K 9/62* (2006.01)

(52) U.S. Cl.
CPC .............. *G06T 7/13* (2017.01); *G06K 9/6202* (2013.01); *G06T 5/002* (2013.01)

(58) Field of Classification Search
CPC ...... H04N 19/172; H04N 19/182; G06T 7/13; G06T 2207/20208; G06T 5/00; G06T 2207/20004; G06K 9/6202; G06T 5/0002
See application file for complete search history.

(56) References Cited

U.S. PATENT DOCUMENTS

| | | | | |
|---|---|---|---|---|
| 5,870,495 A * | 2/1999 | Mancuso | ............. | G06K 9/4633 382/199 |
| 6,078,697 A * | 6/2000 | Ng | ..................... | G06K 9/00456 382/228 |
| 6,175,655 B1 * | 1/2001 | George, III | ............. | G16H 50/50 382/257 |
| 6,665,439 B1 * | 12/2003 | Takahashi | ............. | G06K 9/0063 382/165 |
| 7,400,766 B1 * | 7/2008 | Dominguez | ......... | G06K 9/4609 358/462 |
| 10,335,572 B1 * | 7/2019 | Kumar | .................. | G02B 27/017 |
| 2005/0222688 A1 * | 10/2005 | Zilla | ...................... | A61L 27/225 623/23.72 |
| 2009/0198408 A1 * | 8/2009 | Salman | ............. | B60W 50/0205 701/29.2 |
| 2012/0226482 A1 * | 9/2012 | Wu | ......................... | G06F 30/23 703/2 |

(Continued)

FOREIGN PATENT DOCUMENTS

CN          106097339 A  *  6/2016  ............... G06T 7/00

OTHER PUBLICATIONS

He et al. "Image Edge Detection Method Bsed on teh Derection Feature of Fuzzy Entropy" pp. 3581-3584, IEEE ICNC 2010.*

(Continued)

*Primary Examiner* — Jingge Wu

(57) ABSTRACT

Techniques of detecting edges of objects in images include applying an adaptive threshold to a sigmoidal membership function of a fuzzy gradient of the image brightness. For example, when a computer configured to detect edges of an object of an image receives a grayscale image, the computer computes gradients of the image brightness at each pixel to form a gradient matrix. The computer then creates a fuzzy gradient matrix by applying a sigmoidal membership function to each element of the gradient matrix to form a smoothed gradient matrix. The computer then performs an adaptive threshold operation on the smoothed gradient matrix to produce the edges of the object of the image.

19 Claims, 10 Drawing Sheets

(56) References Cited

U.S. PATENT DOCUMENTS

| | | | | |
|---|---|---|---|---|
| 2016/0042511 | A1* | 2/2016 | Chukka | G06T 7/0012 |
| | | | | 382/133 |
| 2017/0323481 | A1* | 11/2017 | Tran | G06T 19/006 |
| 2018/0326581 | A1* | 11/2018 | Baroudi | B25J 9/1682 |

OTHER PUBLICATIONS

Thakker et al. "Edge Detection Techniques USing Fuzzy Thresholding" pp. 307-312 IEEE World Congress on Information and Communication Technologies 2011.*

Alshennawy, A., et al., "Edge detection in digital images using fuzzy logic techniques", World Academy of Science, Engineering and Technology, International Journal of Computer and Information Engineering, vol. 3, No. 3, 2009, pp. 540-548.

Barkhoda, W., et al., "Fuzzy edge detection based on pixel's gradient and standard deviation values", Proceedings of International Multiconference on Computer Science and Information Technology, Mragowo, Oct. 12-14, 2009, pp. 7-10.

Bezdek, J.C., "A geometric approach to edge detection", IEEE Transactions on Fuzzy Systems, vol. 6, Issue I, 1998, pp. 52-75.

Bhandarkar, S.M., et al., "An Edge Detection Technique Using Genetic Algorithm-Based Optimization", Pattern Recognition, Elsevier Publications, vol. 27, Issue 9, 1994, pp. 1159-1180.

Bloch, I., "Fuzzy sets in image processing", Proceedings of ACM Symposium on Applied Computing, New York, USA, Mar. 6-8, 1994, pp. 175-179.

Canny, "A computational approach to edge detection", IEEE Transactions on Pattern Analysis and Machine Intelligence, vol. 8, Issue 1, 1986, pp. 679-698.

Chen, X., "An Improved Edge Detection in Noisy Image Using Fuzzy Enhancement", Proceedings of International Conference on Biomedical Engineering and Computer Science, Wuhan, Apr. 23-24, 2010, pp. 1-4.

De-Sian, L., et al., "Edge detection improvement by ant colony optimization", Pattern Recognition Letters, Elsevier Publications, vol. 29, Issue 4, 2008, pp. 416-425.

Dorigo, M., et al., "Ant system: optimization by a colony of cooperating agents", Part B: Cybernetics, IEEE Transactions on Systems, Man, Cybernetics, vol. 26, Issue 1, 1996, pp. 29-41.

Jiang, X., et al., "Edge Detection in Range Images Based on Scan Line Approximation", Journal on Computer Vision and Image Understanding, vol. 73, Issue 2,, Feb. 1999, pp. 183-199.

Jiang, L., et al., "Image edge detection based on fuzzy weighted morphological filter", Proceedings of the Eighth International Conference on Machine Learning and Cybernetics, Baoding, Jul. 12-15, 2009, pp. 690-693.

Kennedy, J., et al., "Particle swarm optimization", Proceedings of IEEE International Conference on Neural Networks vol. IV, IEEE service center, Piscataway, NJ, Nov. 27-Dec. 1, 1995, pp. 1942-1948.

Khalid, N.E.A., et al., "Fusion of Fuzzy Heuristic and Particle Swarm Optimization as an edge detector", Proceedings of International Conference on Information Retrieval & Knowledge Management, Shah Alam, Selangor, Mar. 17-18, 2010, pp. 250-254.

Madasu, H., et al., "Fuzzy Edge and Corner Detector for Color Images", Proceedings of 6th International Conference on Information Technology: New Generations, Las Vegas, NV, 2009, pp. 1301-1306.

Madasu, V.K., et al., "Fuzzy Edge Detection in Biometric Systems", 36th Applied Imagery Pattern Recognition Workshop (aipr 2007), Oct. 10-12, 2007, pp. 139-144.

Marr, D., et al., "Theory of edge detection", Proceedings of the Royal Society of London, Royal Society, Great Britain,, Feb. 29, 1980, pp. 187-217.

Melin, P. et al., "An improved method for edge detection based on interval type-2 fuzzy logic", Journal on Expert Systems with Applications, Elsevier Publications, vol. 37, Issue 12, 2010, pp. 8527-8535.

Pal, S.K., et al., "On edge detection of X-ray images using fuzzy sets", IEEE Trans. Pattern Analysis and Machine Intelligence, vol. 5, Issue 1, 1983, pp. 69-77.

Passino, K. M., "Biomimmicry of bacterial foraging for distributed optimization and control", IEEE Control Systems Magazine, vol. 22, Issue 3, 2002, pp. 52-67.

Perona, P., et al., "Scale-Space and Edge Detection Using Anisotropic Diffusion", IEEE Transactions on pattern analysis and machine intelligence, vol. 12, Issue 7, 1990, pp. 629-639.

Rashedi, E., et al., "GSA: a gravitational search algorithm", Journal on Information Science, Elsevier Publications, vol. 179, Issue 13, 2009, pp. 2232-2248.

Russo, F., "FIRE operators for image processing", Fuzzy Sets and Systems, vol. 103, Issue 2, 1999, pp. 265-275.

Setayesh, M., et al., "Edge and Corner Extraction Using Particle Swarm optimisation", Proceedings of Australasian Conference on Artificial Intelligence, Adelaide, Australia, Dec. 7-10, 2010, pp. 323-333.

Smith, S.M., et al., "SUSAN: A new approach to low level image processing", International Journal of Computer Vision, vol. 23, Issue 1, 1997, pp. 45-78.

Sun, G., et al., "A novel approach for edge detection based on the theory universal gravity", Pattern Recognition Journal, Elsevier Publications, vol. 40, Issue 10, 2007, pp. 2766-2775.

Verma, O.P., et al., "A novel approach for edge detection using ant colony optimization and fuzzy derivative technique", IEEE international Advance Computing Conference, Mar. 6-7, 2009, pp. 1206-1212.

Verma, O.P., et al., "A Novel Bacterial Foraging Technique for Edge Detection", Pattern Recognition Letters, Elsevier Publications, vol. 32, Issue 8, 2011, pp. 1187-1196.

Verma, O.P., et al., "A Novel Fuzzy Ant System for Edge Detection", Proceedings of 9th International Conference on Computer and Information Science, Yamagata, Japan, Mar. 6-7, 2010, pp. 228-233.

Wu, J., et al., "The Fast Multilevel Fuzzy Edge Detection of Blurry Images", IEEE signal processing letters, vol. 14, Issue 5, 2007, pp. 344-347.

Zhai, Y., et al., "Multiscale Edge Detection Based on Fuzzy C-Means Clustering", Proceedings of 1st International Symposium on Systems and Control in Aerospace and Astronautics, Harbin, Jun. 19-21, 2006, pp. 1201-1204.

Zhang, J., et al., "A New Method of Fuzzy Edge Detection Based on Gauss Function", Proceedings of 2nd International Conference on Computer and Automation Engineering, Singapore, Feb. 26-28, 2010, pp. 559-562.

Zhang, D., et al., "An Improved Edge Detection Algorithm Based on Image Fuzzy Enhancement", Proceedings of 4th IEEE Conference on Industrial Electronics and Applications, Xi'an, May 25-27, 2009, pp. 2412-2415.

* cited by examiner

604

606

608

610

802

804

806

808

810

902

904

906

908

910

1002

1004

1006

1008

1010

EDGE DETECTION USING FUZZY GRADIENT INFORMATION

TECHNICAL FIELD

This description relates to detecting edges of objects in images.

BACKGROUND

Some image processing applications generate edges that define objects in an image. An edge is a boundary between two dissimilar regions in an image. For example, in some cases, replacing the pixels of an image with the edges of objects in the image may reduce the amount of data needed to represent the objects in the image. The replacement of the pixels with edges may be useful in applications such as computer vision.

Conventional approaches to detecting edges of objects in images include determining first derivatives in both the horizontal and vertical directions and second derivatives of the brightness of the image at each pixel. The second derivatives may indicate a location of an edge while the first derivatives may indicate the direction of an edge. In some implementations, the image may be smoothed using a smoothing filter to reduce artifacts in the edges due to noise in the image.

The above-described conventional approaches to detecting edges of objects in images are inaccurate when there are significant amounts of noise in an image. For example, in the presence of noise, the conventional approaches may produce edges that have poor connectivity and accuracy and/or false edges, i.e. edges that are not really part of an object of an image.

SUMMARY

In one general aspect, a method can include receiving image data representing a plurality of pixels of the image, each of the plurality of pixels including a brightness value. The method can also include generating gradient matrix data representing a gradient matrix having elements, each element of the gradient matrix corresponding to a respective pixel of the plurality of pixels and including a gradient of the brightness value of the pixel. The method can further include generating membership function data representing a membership function matrix having elements, each element of the membership function matrix including a sigmoidal function of a respective element of the gradient matrix. The method can further include performing an adaptive threshold operation on the membership function data to produce the edges of the object in the image, the adaptive threshold operation including generating a local threshold corresponding to a subset of the plurality of pixels of the image, the local threshold being based on the brightness values of the pixels of the subset of the plurality of pixels of the image.

The details of one or more implementations are set forth in the accompanying drawings and the description below. Other features will be apparent from the description and drawings, and from the claims.

DETAILED DESCRIPTION

Figure 1:
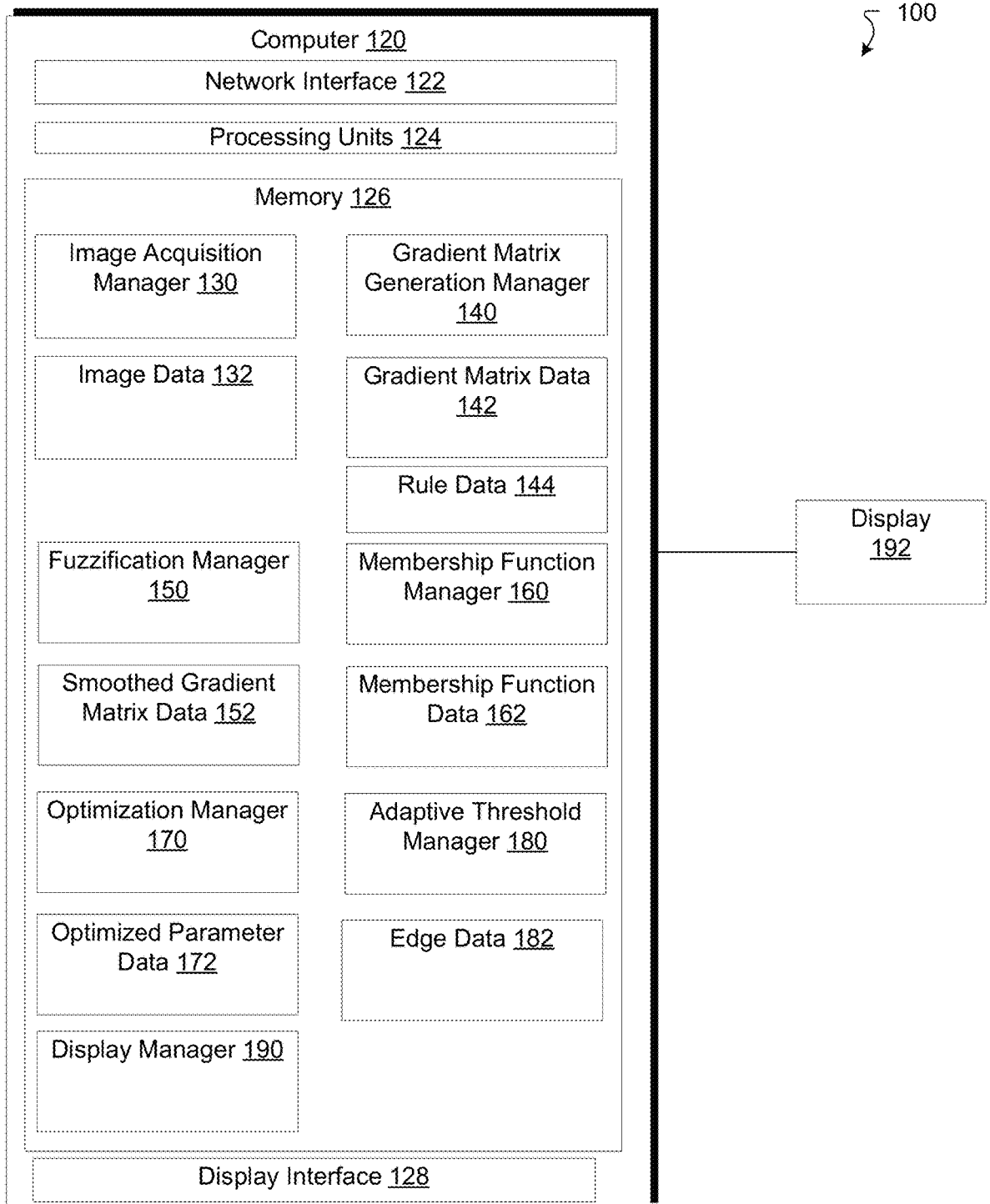
FIG. 1 is a diagram illustrating an example electronic environment in which improved techniques described herein may be implemented.

Conventional approaches to detecting edges of objects in images include determining first derivatives in both the horizontal and vertical directions and second derivatives of the brightness of the image at each pixel. The second derivatives may indicate a location of an edge while the first derivatives may indicate the direction of an edge. In some implementations, the image may be smoothed using a smoothing filter to reduce artifacts in the edges due to noise in the image.

The above-described conventional approaches to detecting edges of objects in images are inaccurate when there are significant amounts of noise in an image. For example, in the presence of noise, the conventional approaches may produce edges that have poor connectivity and/or false edges.

In accordance with the implementations described herein and in contrast to the above-described conventional approaches to detecting edges of objects in images, improved techniques of detecting edges of objects in images include applying an adaptive threshold to a sigmoidal membership function of a fuzzy gradient of the image brightness. For example, when a computer configured to detect edges of an object of an image receives a grayscale image, the computer computes gradients of the image brightness at each pixel to form a gradient matrix. The computer then creates a fuzzy gradient matrix by applying a sigmoidal membership function to each element of the gradient matrix to form a smoothed gradient matrix. The computer then performs an adaptive threshold operation on the smoothed gradient matrix to produce the edges of the object of the image.

Advantageously, the improved techniques described above produce edges that have improved connectivity over the conventional approaches without introducing false edges, i.e., edges that are not really part of an object in an image. The selection of the net gradients of the gradient matrix (i.e., the median over all directions), combined with the fuzzifying sigmoidal membership function, produce an accurate description of an edge in a particular direction. The conventional approaches to detecting edges of objects in images, which do not make use of selection rules for determining the direction of an edge and which do not use sigmoidal membership functions, frequently produce inaccurate edges.

The value of obtaining accurate edges of an object in an image may be seen in images such as those produced in, for example, computerized axial tomography (CAT) scans and magnetic resonance imaging (MRI). In such medical applications, the accurate determination of an edge can make the difference between a good diagnosis of a medical condition and a false one. Detection techniques that produce false and/or discontinuous edges may result in unreliable diagnoses.

Another application in which detecting edges accurately is important is in scanning electron microscopy. Edge detection there is used to characterize features being measured by a scanning electron microscope (SEM). Inaccurate edge detection in a SEM may lead to inaccurate diagnoses of, e.g., semiconductor manufacturing processes, for which the edges of very small circuit elements need to be accurately detected. Such an inaccurate edge detection could lead to inaccurate processes, costing millions of dollars due to poor yields.

In some implementations, generating the membership function data includes performing a smoothing operation on the gradient matrix data to produce smoothed gradient matrix data representing a smoothed gradient matrix having elements, each element of the smoothed gradient matrix including a smoothing function of a respective element of the gradient matrix. The adaptive threshold operation on the membership function data is performed on the smoothed gradient matrix data.

In some implementations, the smoothing function of an element of the gradient matrix includes a power of a square of a ratio of a difference between (i) the element of the gradient matrix and a first parameter and (ii) a second parameter, the power and the first and second parameters being fixed numbers independent of the pixel of the plurality of pixels to which the element corresponds.

In some implementations, the sigmoidal function of an element of the gradient matrix is a linear ramp between a lower value and an upper value when the gradient of the brightness value of the pixel to which the element corresponds has a value between a lower fuzzy value and an upper fuzzy value.

In some implementations, the sigmoidal function of an element of the gradient matrix is based on a set of parameters, each of the set of parameters being determined by optimizing a figure of merit, the figure of merit being based on the sigmoidal membership function.

In some implementations, the figure of merit is a difference between a fuzzy entropy determined from the sigmoidal membership function and a specified value of the fuzzy entropy.

In some implementations, optimizing the figure of merit includes inputting the figure of merit into a derivative-free optimization algorithm for which an output includes values of the set of parameters.

In some implementations, the gradient of the brightness value of a pixel is a net difference between the brightness at neighboring pixels in one of a plurality of directions, the plurality of directions including north, east, south, west, northeast, northwest, southeast, and southwest.

In some implementations, the net difference between the brightness at neighboring pixels in a direction of the plurality of directions is generated from a plurality of differences in that direction according to a set of rules corresponding to that direction.

In some implementations, the set of rules corresponding to a direction includes a rule setting, as the net difference in that direction, a maximum difference of the plurality of differences in that direction.

In some implementations, generating the gradient matrix data includes setting, as the net difference between the brightness at neighboring pixels in one of a plurality of directions, a median of differences between the brightness at neighboring pixels in the plurality of directions.

In some implementations, generating the gradient matrix data includes generating additional padded brightness values outside of a boundary of the image, the additional padded brightness values producing gradients of the brightness value of the pixel at the boundary of the image.

FIG. 1 is a diagram that illustrates an example electronic environment 100 in which the above-described improved techniques may be implemented. As shown, in FIG. 1, the electronic environment 100 includes a computer 120 and a display 192.

The computer 120 is configured to display user-specified drawings on a display device. The computer 120 includes a network interface 122, one or more processing units 124, memory 126, and a display interface 128. The network interface 122 includes, for example, Ethernet adaptors, Token Ring adaptors, and the like, for converting electronic and/or optical signals received from a network to electronic form for use by the editing computer 120. The set of processing units 124 include one or more processing chips and/or assemblies. The memory 126 includes both volatile memory (e.g., RAM) and non-volatile memory, such as one or more ROMs, disk drives, solid state drives, and the like. The set of processing units 124 and the memory 126 together form control circuitry, which is configured and arranged to carry out various methods and functions as described herein.

In some embodiments, one or more of the components of the computer 120 can be, or can include processors (e.g., processing units 124) configured to process instructions stored in the memory 126. Examples of such instructions as depicted in FIG. 1 include image acquisition manager 130, a gradient matrix generation manager 140, a fuzzification manager 150, a membership function manager 160, an optimization manager 170, an adaptive threshold manager 180, and a display manager 190. Further, as illustrated in FIG. 1, the memory 126 is configured to store various data, which is described with respect to the respective managers that use such data.

The image acquisition manager 130 is configured to obtain image data 132 representing an image of an object that may be displayed on the display device 190. In some implementations, the image acquisition manager 130 is configured to.

The image data 132 includes data that represents a brightness of an object as a grayscale image. In some implementations, the image data 132 includes color data, e.g., RGB data. In some implementations, the image data 132 includes data in a PNG, JPEG, bitmap, or other graphic format. In some implementations, the image data 132 is in a scalar or vector format proprietary to the drawing application.

The gradient matrix generation manager 140 is configured to generate gradient matrix data 142. In some implementations, the gradient matrix generation manager 140 is configured to evaluate, as a gradient in any of the directions shown in the subset of the plurality of pixels 300 shown in FIG. 3 surrounding a pixel, e.g., the pixel 302, a difference between the brightness of neighboring pixels in any of those directions. In some implementations, the gradient matrix generation manager 140 is configured to evaluate the differences in all of those directions and evaluate, as a gradient, a value based on the differences in all of the directions. In some implementations, the value is equal to the median of the differences in all of the directions.

The gradient matrix data 142 represents a gradient matrix of gradient values (e.g., differences in brightness between neighboring pixels), each entry of the gradient matrix corresponding to a pixel. Neighboring entries in the gradient matrix correspond to neighboring pixels.

Figure 3:
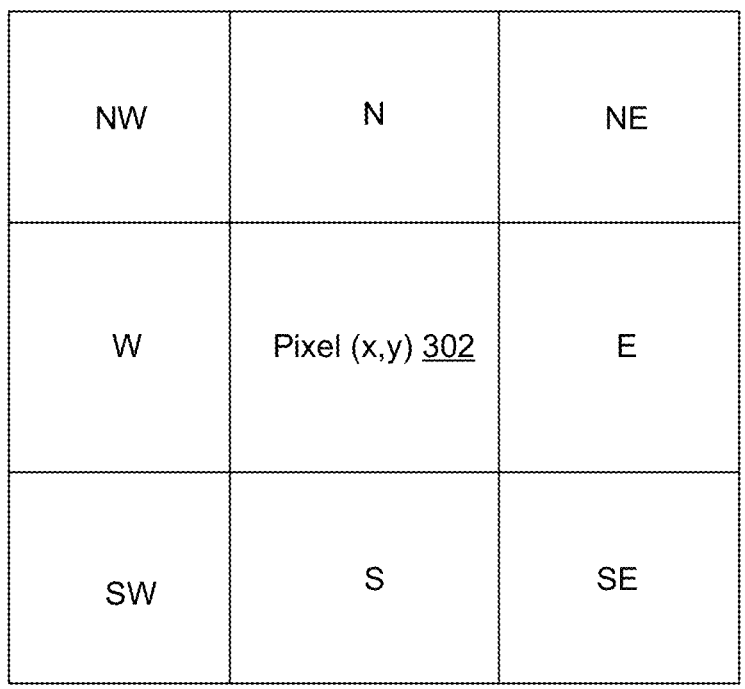
FIG. 3 is a diagram illustrating an example layout of directions with respect to a pixel of an image.
Figure 4:
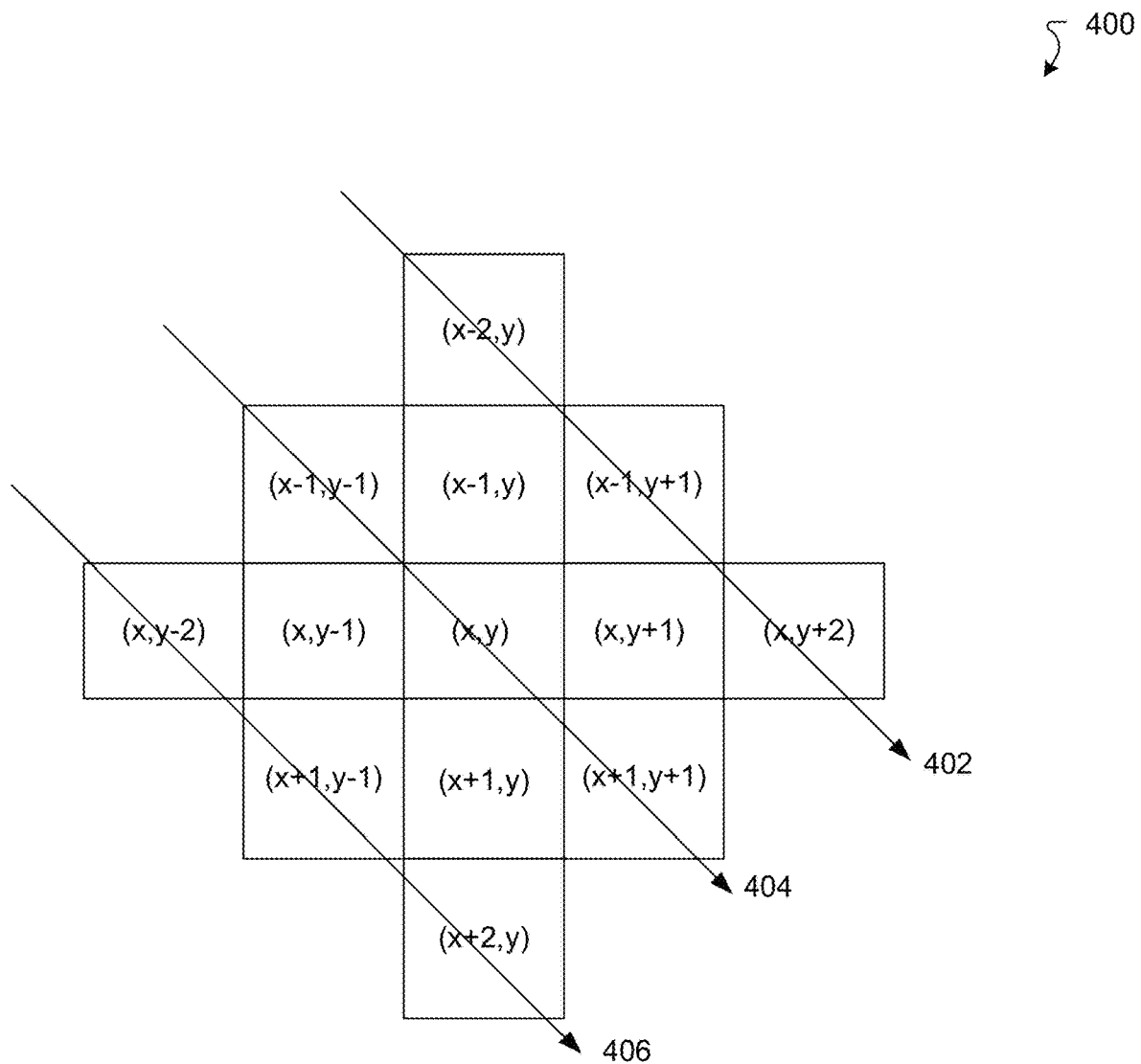
FIG. 4 is a diagram illustrating an example layout of possible gradients used in computing a gradient matrix.

The rule data 144 represents a set of rules for evaluating a gradient of brightness in a direction at a pixel, e.g., pixel 302 of FIG. 3. For example, the grid 400 shown in FIG. 4 illustrates possible gradients in one particular direction (NW) for the pixel with coordinates (x,y) in the center of the subset. The set of rules represented by the rule data 144 then determines which of those gradients is selected as the gradient for that direction.

The fuzzification manager 150 is configured to apply a fuzzification function to the gradient matrix data 142 to produce the smoothed gradient matrix data 152. The fuzzification function is used to smooth out any noise in the image data 132; such noise may be magnified by the evaluation of gradients in the gradient matrix data 142. In some implementations, the fuzzification function takes the form $$\mu_{bell}(\nabla(i)) = \frac{1}{1 + \left|\frac{\nabla(i) - \alpha}{\beta}\right|^{2\gamma}},$$

where $\mu_{bell}$ is the fuzzification function, and $\nabla(i)$ is the ith element of the gradient matrix in flattened form (that is, for an M×M pixel array representing an image, the gradient matrix in flattened form is a $M^2 \times 1$ array, or vector of length $M^2$. The parameters $\alpha$, $\beta$, and $\gamma$ are found as part of an optimization scheme. In some implementations, the fuzzification function $\mu_{bell}$ has a different functional form, e.g., a Gaussian with parameters for optimization representing an amplitude, a mean, and a variance.

The smoothed gradient matrix data 152 represents a smoothed gradient matrix, or flattened matrix, whose ith element has a value equal to $\mu_{bell}(\nabla(i))$.

The membership function manager 160 is configured to apply a sigmoidal membership function to the smoothed gradient matrix data 152 to produce the membership function data 162. The sigmoidal membership function is used to accentuate the edges in the image. In some implementations, the sigmoidal membership function takes the form $$\mu_{HIGH}(\mu_{bell}(\nabla(i))) = \begin{cases} 0, & \mu_{bell}(\nabla(i)) \in [0, a] \\ \frac{\mu_{bell}(\nabla(i)) - a}{b - a}, & \mu_{bell}(\nabla(i)) \in (a, b) \\ 1, & \mu_{bell}(\nabla(i)) \geq b \end{cases}$$

where $\mu_{HIGH}$ is the sigmoidal membership function and a and b are parameters that are found as a result of an optimization scheme. In some implementations, the sigmoidal membership function has a different functional form, e.g., a hyperbolic tangent function.

The membership function data 162 represents a matrix, or flattened matrix, whose ith element has a value equal to $\mu_{HIGH}(\mu_{bell}(\nabla(i)))$.

The optimization manager 170 is configured to perform an optimization on a figure of merit based on the membership function data 162 represented by $\mu_{HIGH}(\mu_{bell}(\nabla(i))) = \mu_{HIGH}(i)$ to produce optimized parameter data 172.

For the example membership function described above, the optimization scheme would provide, as the optimized parameter data 172, values of $\alpha$, $\beta$, $\gamma$, a, and b that optimize a figure of merit. In some implementations, the figure of merit is a difference between a fuzzy entropy and a specified value of the fuzzy entropy. In some implementations, the figure of merit J may take the form $J = E_d - E$, where the fuzzy entropy E has the following form:

$$E = -\frac{1}{M \log 2} \sum_{i=0}^{M^2 - 1} (\mu_{HIGH}(i) \log(\mu_{HIGH}(i)) + (1 - \mu_{HIGH}(i)) \log(1 - \mu_{HIGH}(i)))$$

and $E_d$, in some implementations, may take a value such as 0.5.

The optimization manager 170 is further configured to perform an optimization operation on the figure of merit J. In some implementations, the optimization operation includes a derivative-free optimization algorithm. Examples of such optimization algorithms include a Bacterial Foraging (BF) algorithm, a Genetic Algorithm (GA), a Particle Swarm Optimization (PSO) algorithm, and a Gravitational Search Algorithm (GSA).

The adaptive threshold manager 180 is configured to perform an adaptive threshold operation on the membership function data to produce edge data 182 that represents the edges of objects in the image represented by the image data 132. In the adaptive threshold operation, a threshold is varied over different local neighborhoods based on spatial variations in illumination in an image. Binary thresholding, which produces the edge data 182 in each local neighborhood, is facilitated through adaptive thresholding by analyzing each pixel with respect to its local neighborhood adaptively. In some implementations, the adaptive threshold operation includes examining the intensity values of the local neighborhood of each pixel by computing the mean or the median value. In some implementations, the adaptive threshold operation includes examining the intensity values of the local neighborhood of each pixel by computing a ratio of the median to the mean of the minimum and maximum values of the local intensity distribution. During the adaptive threshold operation, individual pixels in an image are marked as "object" pixels if their value is greater than the threshold value (assuming an object to be brighter than the background) and as "background" pixels otherwise. In some implementations, the size of the local neighborhood is large enough to cover sufficient foreground and background pixels.

In some implementations, the mean value of the brightness of pixels over local neighborhood (e.g., a 10×10 array) is specified as part of the edge detection process. For example, increasing the mean value of the adaptive thresholding may lead to less noise at the cost of losing some edges.

The edge data 182 represents the edges generated by the adaptive threshold manager 180. In some implementations, the edge data 182 takes the form of a matrix having binary values, where a "1" represents an edge portion and a "0" represents a portion of space interior or exterior to an edge.

The display manager 190 is configured to represent the edge data 182 as rendered for viewing on the display device 192.

The components (e.g., modules, processing units 124) of the computer 120 can be configured to operate based on one or more platforms (e.g., one or more similar or different platforms) that can include one or more types of hardware, software, firmware, operating systems, runtime libraries, and/or so forth. In some implementations, the components of the computer 120 can be configured to operate within a cluster of devices (e.g., a server farm). In such an implementation, the functionality and processing of the components of the computer 120 can be distributed to several devices of the cluster of devices.

The components of the computer 120 can be, or can include, any type of hardware and/or software configured to process attributes. In some implementations, one or more portions of the components shown in the components of the computer 120 in FIG. 1 can be, or can include, a hardware-based module (e.g., a digital signal processor (DSP), a field programmable gate array (FPGA), a memory), a firmware module, and/or a software-based module (e.g., a module of computer code, a set of computer-readable instructions that can be executed at a computer). For example, in some implementations, one or more portions of the components of the computer 120 can be, or can include, a software module configured for execution by at least one processor (not shown). In some implementations, the functionality of the components can be included in different modules and/or different components than those shown in FIG. 1.

In some embodiments, one or more of the components of the computer 120 can be, or can include, processors configured to process instructions stored in a memory. For example, an image acquisition manager 130 (and/or a portion thereof), a gradient matrix generation manager 140 (and/or a portion thereof), a fuzzification manager 150 (and/or a portion thereof), a membership function manager 160 (and/or a portion thereof), an optimization manager 170 (and/or a portion thereof), an adaptive threshold manager 180 (and/or a portion thereof), and a display manager 190 (and/or a portion thereof) can be a combination of a processor and a memory configured to execute instructions related to a process to implement one or more functions.

In some implementations, the memory 126 can be any type of memory such as a random-access memory, a disk drive memory, flash memory, and/or so forth. In some implementations, the memory 126 can be implemented as more than one memory component (e.g., more than one RAM component or disk drive memory) associated with the components of the editing computer 120. In some implementations, the memory 126 can be a database memory. In some implementations, the memory 126 can be, or can include, a non-local memory. For example, the memory 126 can be, or can include, a memory shared by multiple devices (not shown). In some implementations, the memory 126 can be associated with a server device (not shown) within a network and configured to serve the components of the editing computer 120. As illustrated in FIG. 1, the memory 126 is configured to store various data, including drawing object data 132, path data 142, subdivision data 152, drawing object position data 162, mapping table data 172, and drawing rendering data 182.

Figure 2:
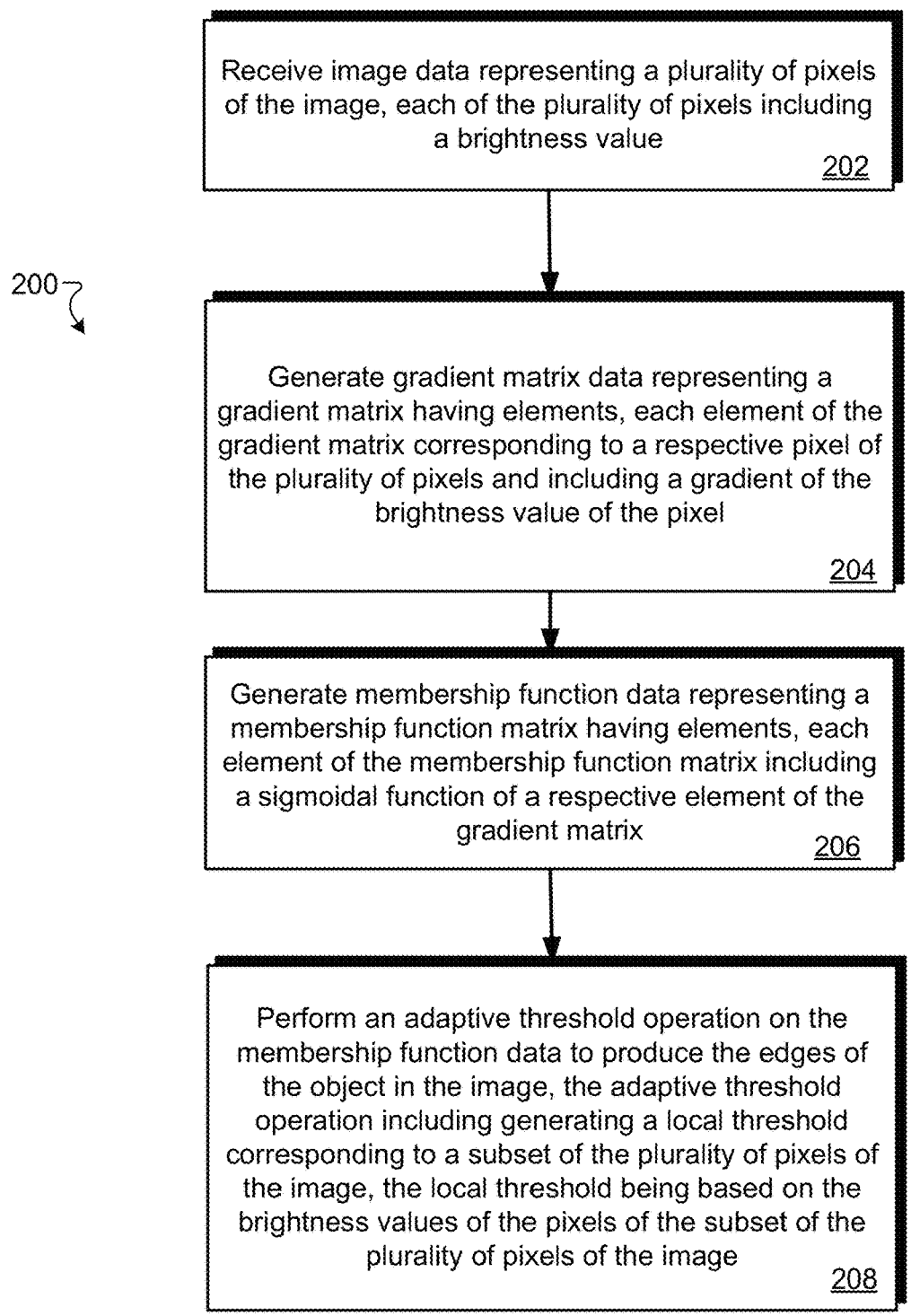
FIG. 2 is a flow chart illustrating an example method of implementing the improved techniques as shown in the electronic environment in FIG. 1.

FIG. 2 is a flow chart depicting an example method 200 of displaying drawings on a display device. The method 200 may be performed by software constructs described in connection with FIG. 1, which reside in memory 126 of the computer 120 and are run by the set of processing units 124.

At 202, the image acquisition manager 130 receives image data (e.g., image data 132) representing a plurality of pixels of an image. Each of the plurality of pixels includes a brightness value.

At 204, the gradient matrix generation manager 140 and, in some implementations, the fuzzification manager 150, generate gradient matrix data 142 representing a gradient matrix (or smoothed gradient matrix). Each element of the gradient matrix and/or smoothed gradient matrix corresponds to a respective pixel of the plurality of pixels and includes a gradient (or fuzzified gradient) of the brightness value of the pixel.

At 206, the membership function manager 160 generates membership function data 162 representing a membership function matrix having elements, each element of the membership function matrix including a sigmoidal function (e.g., $\mu_{HIGH}$) of a respective element of the gradient matrix.

At 208, the adaptive threshold manager 180 performs an adaptive threshold operation on the membership function data 162 to produce the edges (represented by the edge data 182) of the object in the image. The adaptive threshold operation includes generating a local threshold corresponding to a subset of the plurality of pixels of the image. The local threshold is based on the brightness values of the pixels of the subset of the plurality of pixels of the image.

FIG. 3 is a diagram illustrating an example subset 300 of the plurality of pixels including a pixel 302 of the plurality of pixels of an image represented by the image data 132. The pixel 302 has coordinates (x,y). Surrounding the pixel 302 are pixels labeled after the directions relative to the pixel 300, i.e., NW, N, NE, E, SE, S, SW, and W.

FIG. 4 is a diagram illustrating an example subset 400 of the plurality of pixels surrounding the pixel having coordinates (x,y). As shown in FIG. 4, the subset 400 includes neighboring pixels surrounding the pixel having coordinates (x,y) as well as further neighbors in the N, S, E, and W directions.

The subset 400 illustrates an example way of computing a gradient in a particular direction, in this case the SE direction. This is one of eight directions as illustrated in in FIG. 3. Nevertheless, there are several gradients, or differences, in each possible direction. Examples of such differences in the SE direction are shown in FIG. 4 as arrows 402, 404, and 406. In some implementations, the gradient matrix generation manager 140 evaluates three differences in the directions 402, 404, and 406. For example, the three differences evaluated are as follows:

$$\nabla_{SE}(x,y)=|I(x-1,y-1)-I(x,y)|,$$

$$\nabla_{SE}(x-1,y+1)=|I(x-2,y)-I(x-1,y+1)|,$$

$$\nabla_{SE}(x+1,y-1)=|I(x,y-2)-I(x+1,y-1)|,$$

where I denotes the brightness at a pixel coordinate.

The gradient matrix generation manager 140 then selects one of the above differences as the gradient in the SE direction according to the rule data 144. Let the net gradient in the SE direction corresponding to the pixel with coordinates (x,y) be denoted as $\nabla_{SE}^{net}(x,y)$. Then, in some implementations, the rule data 144 represents the following rules:

If $\nabla_{SE}(x,y) \leq \nabla_{SE}(x-1,y+1)$ and $\nabla_{SE}(x,y) \leq \nabla_{SE}(x+1,y-1)$, then $\nabla_{SE}^{net}(x,y)=\max\{\nabla_{SE}(x-1,y+1), \nabla_{SE}(x+1,y-1)\}$;

If $\nabla_{SE}(x-1,y+1) \leq \nabla_{SE}(x,y)$ and $\nabla_{SE}(x-1,y+1) \leq \nabla_{SE}(x+1,y-1)$, then $\nabla_{SE}^{net}(x,y)=\max\{\nabla_{SE}(x,y), \nabla_{SE}(x+1,y-1)\}$;

If $\nabla_{SE}(x+1,y-1) \leq \nabla_{SE}(x,y)$ and $\nabla_{SE}(x+1,y-1) \leq \nabla_{SE}(x-1,y+1)$, then $\nabla_{SE}^{net}(x,y)=\max\{\nabla_{SE}(x,y),\nabla_{SE}(x-1,y+1)\}$.

The above rules correspond to one of the eight directions. The rule data 144 represents similar sets of rules for the eight directions shown in FIG. 2. In this case, the rule data 144 represents twenty-four rules.

That said, the result of evaluating the rules includes eight gradient values for the pixel at the coordinate (x,y). The gradient matrix generation manager 140 computes the gradient at this pixel in terms of the eight computed net gradients. In some implementations, the gradient $\nabla(i)$ of the pixel at the coordinate (x,y) (which is taken to be the $i^{th}$ pixel of the plurality of pixels of the image) is equal to the median of the eight net gradients. In some implementations, this gradient is equal to a mean of the eight net gradients. Other functions of the eight net gradients are also possible.

Note that, if the image consisted only of the 3×3 center grid of pixels, then the other pixels, i.e., the pixels with coordinates (x−2,y), (x,y+2), (x+2,y), (x,y−2) represent padding. The padding pixels are used to provide the pixels on the boundary with gradient values for the gradient matrix. The value of the brightness of the padding pixels can be specified as, e.g., zero, or such that the gradient at the boundary pixels is zero, or anything else.

Figure 5:
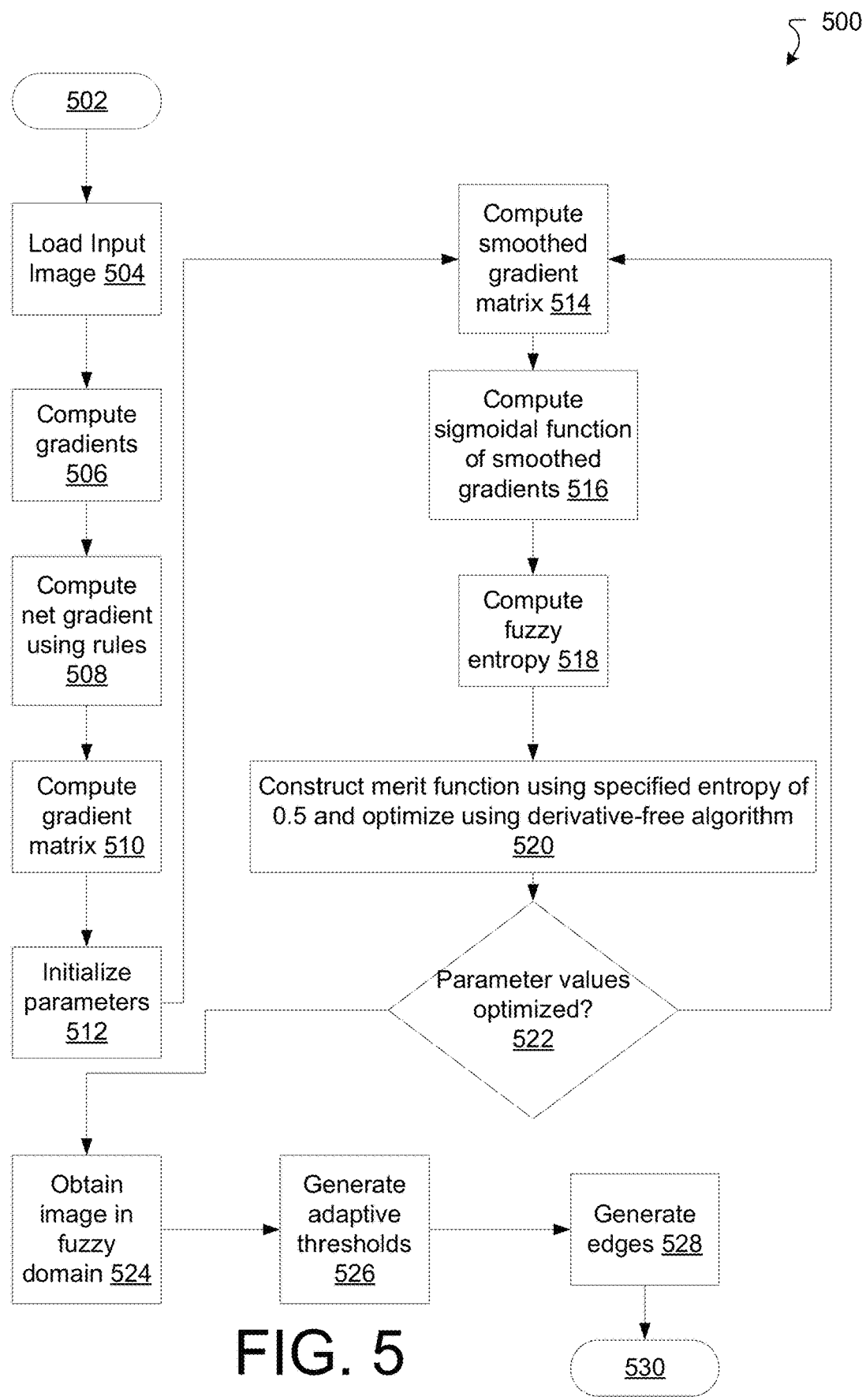
FIG. 5 is a flow chart illustrating an example procedure used to produce edges of an object in an image.

FIG. 5 is a flow chart illustrating an example procedure 500 used to produce edges of an object in an image. The procedure 500, which begins at 502, may be performed by software constructs described in connection with FIG. 1, which reside in memory 126 of the computer 120 and are run by the set of processing units 124.

At 504, the image acquisition manager 130 receives and loads the image data 132 into memory 126 (FIG. 1). For example, the image data 132 includes a M×M pixel array of brightness values representing a grayscale image. Nevertheless, the image does not have to be a grayscale image. In some implementations, the image data 132 represents an RGB color image, in which each color channel may represent a separate image. In this case, however, the gradient computation for a color channel may depend on the other color channels.

At 506, the gradient matrix generation manager 140 computes the three gradients in each of the directions shown in FIG. 3: NW, N, NE, E, SE, S, SW, W. The gradient matrix generation manager 140 generates these gradients from differences such as the absolute values of the differences in the SE direction shown above.

At 508, the gradient matrix generation manager 140 computes the net gradient in each of the eight directions using the rule data 144. The rule data 144 represents rules for selecting one of the three differences for each direction. Examples of such rules for the SE direction are presented above.

At 510, the gradient matrix generation manager 140 generates the gradient matrix ∇(i) from the eight net gradients selected from the rules. In some implementations, the element of the gradient matrix ∇(i) is equal to the median of the eight net gradients. In some implementations, the eight net gradients are sorted in ascending order before computing the element of the gradient matrix ∇(i).

At 512, the fuzzification manager 150 sets initial values of the parameters of the fuzzification and membership functions to be optimized, e.g., the parameters α, β, γ, a, and b described above. The initial values depend on the optimization algorithm used by the optimization manager 170. Specific examples with respect to the four optimization schemes describe above are presented in the Appendix.

At 514, the fuzzification manager 150 generates the smoothed gradient matrix data 152 by applying the fuzzification function $\mu_{bell}(\nabla(i))$ to the gradient matrix data 142. An example of the function $\mu_{bell}$ that depends on the parameters α, β, and γ is given above in terms of the Lorentzian bell-shaped function.

At 516, the membership function manager 160 generates the membership function data 162 by applying the sigmoidal membership function $\mu_{HIGH}$ to the smoothed gradient matrix data 152 representing $\mu_{HIGH}(\mu_{bell}(\nabla(i)))\equiv\mu_{HIGH}(i)$. The sigmoidal membership function $\mu_{HIGH}$ is shown above and depends on the additional parameters a and b.

At 518, the optimization manager 170 computes the fuzzy entropy E based on the membership function data 162, or $\mu_{HIGH}(i)$. The fuzzy entropy E is a scalar quantity that is a sum over the elements of the matrix whose $i^{th}$ element is given by $\mu_{HIGH}(i)\log(\mu_{HIGH}(i))+(1-\mu_{HIGH}(i))\log(1-\mu_{HIGH}(i))$
$\mu_{HIGH}(i)$.

At 520, the optimization manager 170 performs an optimization on the merit function J that is the difference between the specified fuzzy entropy $E_d$ and the fuzzy entropy E described above. The optimization is a minimization of this difference. In some implementations, the value of $E_d$=0.5. The optimization performed is according to one of the derivative-free algorithms described in the Appendix. In some implementations, the optimization is performed using the constraint that each of a and b is between 0 and 1.

At 522, the optimization manager 170 decides whether the current values of the parameters α, β, γ, a, and b are such that the difference described above is minimized. In some implementations, the optimization manager 170 bases its decision on comparisons between current and previous values of the merit function J. If the comparison indicates that a minimum has not been reached, then the optimization manager 170 returns the procedure 500 back to 514. If the comparison indicates that a minimum has been reaches, then the optimization manager 170 advances to 524.

At 524, the optimal values of the parameters α, β, γ, a, and b have been determined. In this case, the adaptive threshold manager 180 uses these optimized parameter values to compute new membership function data 162 based on those parameter values. This is the image in the fuzzy domain.

At 526, the adaptive threshold manager 180 performs the adaptive threshold operation on the membership function data 162 derived at 524 to produce the local binary thresholds over the image. In some implementations, the adaptive threshold manager 180 uses a specified mean value as a tradeoff between noise in the image and the number of edges that are detected.

At 528, the adaptive threshold manager 180 generates the edge data 182 from the local binary thresholds across the image. In some implementations, the At 530, the procedure 500 ends.

Figure 6:
FIG. 6 is a diagram illustrating example images used herein to show results of edges upon optimizing using various derivative-free algorithms.
Figure 6:
Figure 6:
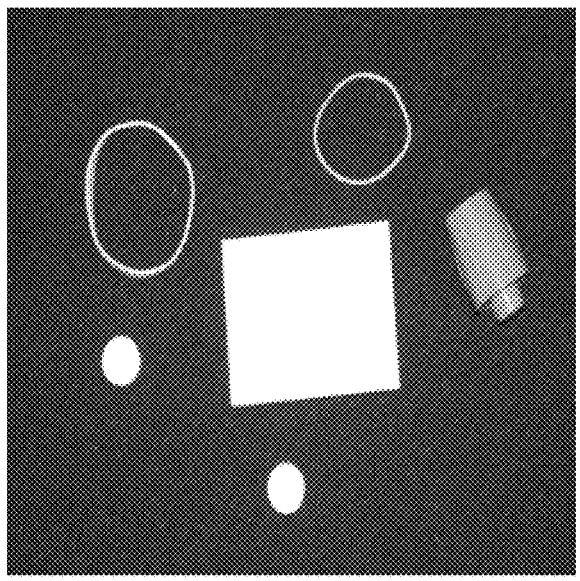
Figure 6:
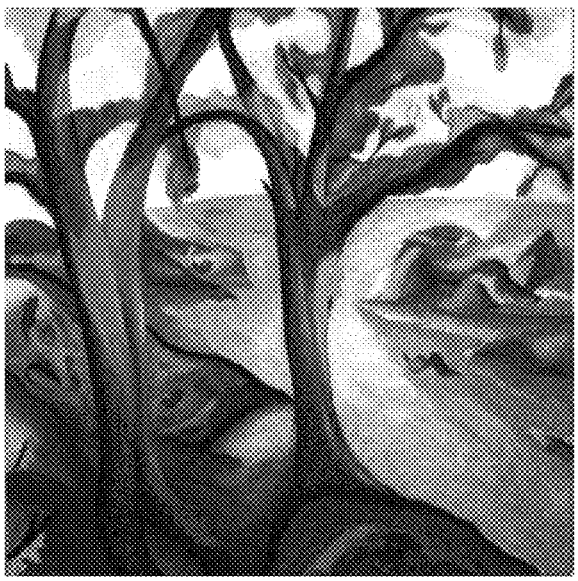

FIG. 6 is a diagram illustrating example images 600 used herein to show results of edges upon optimizing using various derivative-free algorithms. FIG. 6 shows four images: Lena 604, Cameraman 606, Pillset 608, and Trees 610. The results of the edge detection using the optimization scheme described above, using each of the four derivative-free algorithms are presented in FIGS. 7-10.

The edges corresponding to each image 604, 606, 608, and 610, found through the various derivative-free algorithms, are compared with edges generated using a standard algorithm (Canny). The quality of the edge detection in each case is evaluated using a pair of metrics: Cohen's kappa and Shannon's entropy.

Cohen's kappa is a measure of accuracy for pixel-to-pixel comparison between two images, and is defined as follows:

$$\kappa = \frac{p_0 - p_e}{1 - p_e},$$

where $p_0$ is the relative observed pixel-to-pixel agreement between the two images, and $p_e$ is the hypothetical probability of chance pixel-to-pixel agreement between the two images.

Shannon's entropy is a measure of indefiniteness of an image and is defined as follows:

$$H(I) = -\sum_{i=0}^{N-1} p_i \log p_i,$$

where I represents an image having an entropy to be measured and $p_i$ is a frequency of pixels with a (quantized) brightness equal to i. When the image has binary levels of brightness, one computes $p_i$ over a window (e.g., 3×3) centered at a pixel of interest as the brightness value.

Table 1 shows selected mean values for the adaptive thresholding for each of the images, as well as the initial values of the five parameters $\alpha$, $\beta$, $\gamma$, a, and b described above and the corresponding value of the figure of merit J.

TABLE 1

Values of mean, initial values of parameters, and figure of merit for each image

| Test Image | mean | $\alpha$ | $\beta$ | $\gamma$ | a | b | J |
|---|---|---|---|---|---|---|---|
| Lena | 0.05 | 1 | 100 | 4 | 0.5 | 0.9 | 0.4074 |
| Cameraman | 0.07 | 1 | 100 | 4 | 0.5 | 0.9 | 0.1570 |
| Pillset | 0.2 | 1 | 100 | 4 | 0.5 | 0.9 | 0.1944 |
| Trees | 0.1 | 1 | 100 | 4 | 0.5 | 0.9 | 0.4653 |

Figure 7:
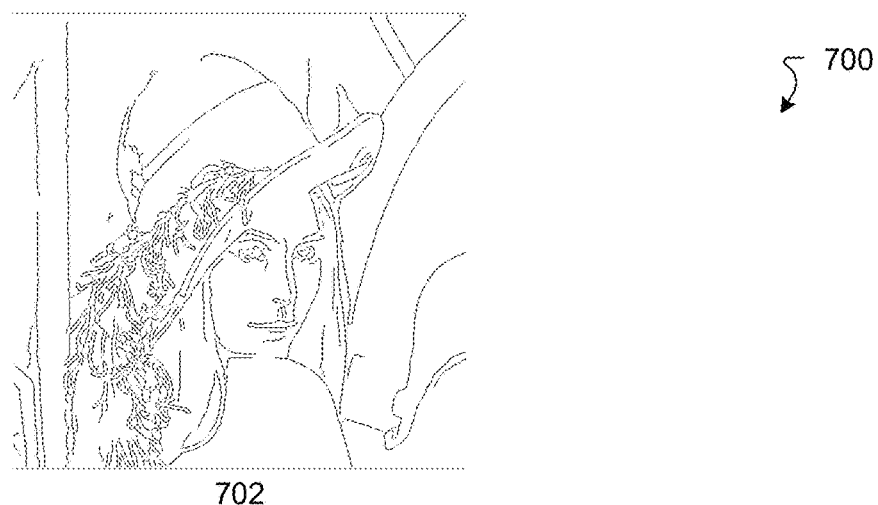
FIG. 7 is a diagram illustrating an example result of using one of the images in FIG. 6, compared with a result using a Canny algorithm.
Figure 7:
Figure 7:
Figure 7:
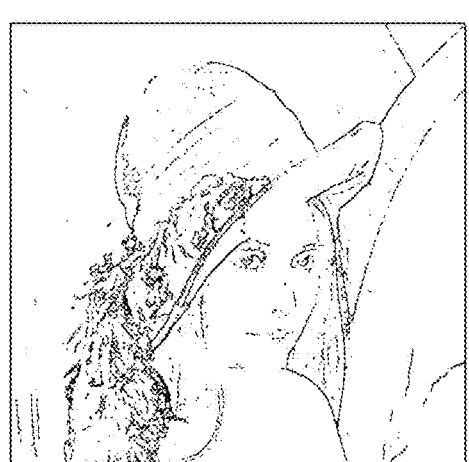
Figure 7:
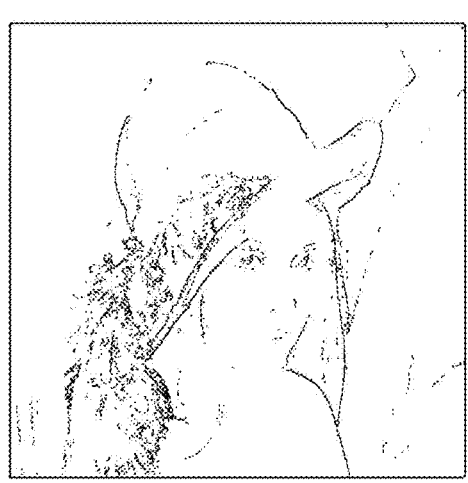

FIG. 7 is a diagram illustrating an example result of using the Lena image 604 in FIG. 6, compared with conventional results. For example, the edge detection result 702 was generated using the Canny algorithm. The images in 704, 706, 708, and 710 were generated using the improved techniques described herein, with the Bacterial Foraging (BF), the Genetic Algorithm (GA), the Particle Swarm Optimization (PSO) algorithm, and the Gravitational Search Algorithm (GSA), respectively.

Table 2 shows optimized values of the parameters $\alpha$, $\beta$, $\gamma$, a, and b as well as the optimal value of the figure of merit J for the Lena image.

TABLE 2

Optimized values of the parameters $\alpha$, $\beta$, $\gamma$, a, and b as well as the optimal value of the figure of merit J for the Lena image

| Algorithm | $\alpha$ | $\beta$ | $\gamma$ | a | b | J |
|---|---|---|---|---|---|---|
| BF | 0.9064 | 101.2279 | 4.4760 | 0.4603 | 0.9609 | 0.2503 |
| GA | 1.0964 | 101.7698 | 3.5060 | 0.4024 | 0.8012 | 0.4267 |
| PSO | 0.9773 | 99.9673 | 4.3074 | 0.5137 | 0.8902 | 0.4011 |
| GSA | 1.1419 | 99.9235 | 4.7950 | 0.7274 | 0.9416 | 0.4004 |

Table 3 shows comparisons of Cohen's Kappa values of the edges detected using the BF algorithm with the improved techniques (IT) described herein against various conventional algorithms: Canny (shown in 702), Sobel, SUSAN, Edison, and NBFTED.

The comparison between each algorithm is made using a majority image derived from each of the listed conventional techniques. A pixel in the majority image is an edge pixel if the majority of the methods claim to have an edge pixel in its neighborhood, with at least one centered on it. In Table 3, the second column ("Majority") is the Cohen's Kappa value between the majority image using all five conventional algorithms listed above and the improved techniques using the algorithm corresponding to each row. The third column includes the Cohen's Kappa value between the majority image using all conventional algorithms listed above except the Canny algorithm and the Canny algorithm. The third column also includes the Cohen's Kappa value between the majority image using all conventional algorithms listed above except the Canny algorithm and the improved techniques using the algorithm corresponding to each row. The values in the fourth through the seventh columns are defined analogously. It is noted that, because Cohen's Kappa is a statistically defined metric, it value varies slightly for the value between the majority image using all conventional algorithms listed above except the Canny algorithm and the improved techniques.

TABLE 3

Cohen's Kappa values between majority images of conventional edge detectors and the improved techniques described herein for the Lena image.

| Algorithm | Majority | Canny/IT | Sobel/IT | SUSAN/IT | Edison/IT | NBFTED/IT |
|---|---|---|---|---|---|---|
| BF | 0.414 | 0.383/0.316 | 0.409/0.356 | 0.462/0.383 | 0.437/0.411 | 0.449/0.417 |
| GA | 0.408 | 0.348/0.325 | 0.412/0.319 | 0.518/0.342 | 0.478/0.349 | 0.483/0.436 |
| PSO | 0.418 | 0.342/0.319 | 0.363/0.308 | 0.411/0.394 | 0.532/0.402 | 0.481/0.387 |
| GSA | 0.426 | 0.578/0.312 | 0.429/0.387 | 0.543/0.435 | 0.480/0.407 | 0.496/0.393 |

A Cohen's Kappa value of 0.5 or higher gives rise to poor performance of an edge detector. As shown in Table 3, however, the improved techniques consistently provide a lower Cohen's Kappa value than the conventional approaches, sometimes significantly so. This would indicate that the improved techniques described herein provide much better edge detection performance than the conventional approaches.

Figure 8:
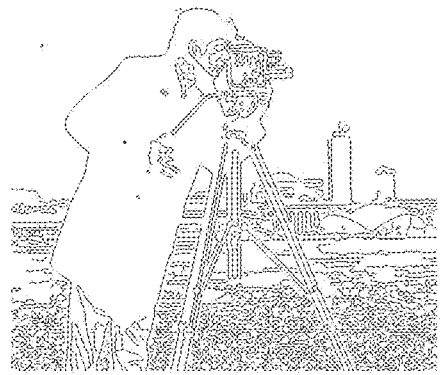
FIG. 8 is a diagram illustrating an example result of using one of the images in FIG. 6, compared with a result using a Canny algorithm.
Figure 8:
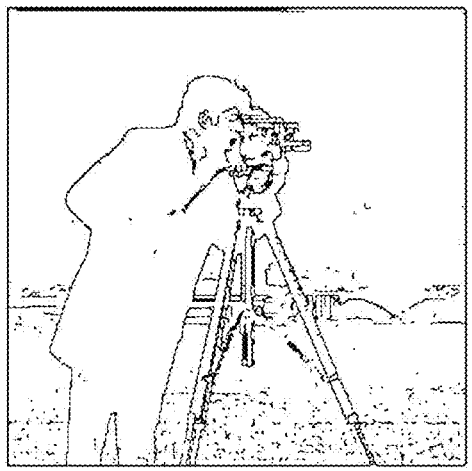
Figure 8:
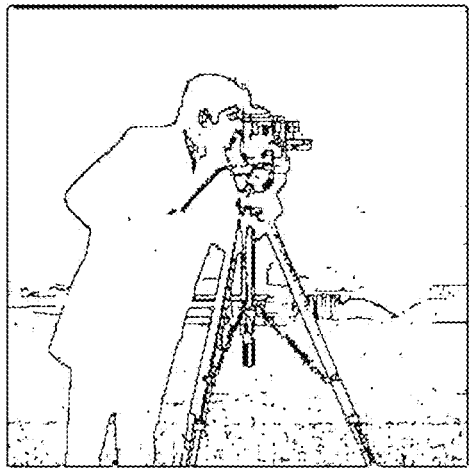
Figure 8:
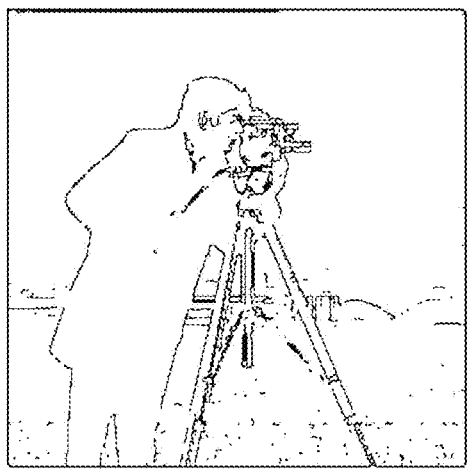
Figure 8:
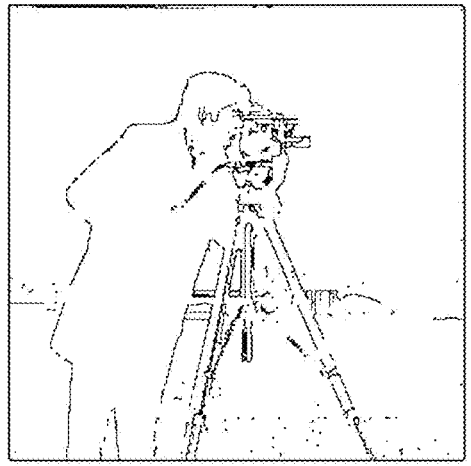

FIG. 8 is a diagram illustrating an example result of using the Cameraman image 606 in FIG. 6, compared with conventional results. For example, the edge detection result 802 was generated using the Canny algorithm. The images in 804, 806, 808, and 810 were generated using the improved techniques described herein, with the Bacterial Foraging (BF), the Genetic Algorithm (GA), the Particle Swarm Optimization (PSO) algorithm, and the Gravitational Search Algorithm (GSA), respectively.

Table 4 shows optimized values of the parameters $\alpha$, $\beta$, $\gamma$, a, and b as well as the optimal value of the figure of merit J for the Lena image.

TABLE 4

Optimized values of the parameters $\alpha$, $\beta$, $\gamma$, a, and b as well as the optimal value of the figure of merit J for the Cameraman image

| Algorithm | $\alpha$ | $\beta$ | $\gamma$ | a | b | J |
|---|---|---|---|---|---|---|
| BF | 1.0906 | 101.3132 | 4.4411 | 0.4802 | 0.9426 | 0.0707 |
| GA | 0.8024 | 102.4991 | 3.4114 | 0.4136 | 0.7911 | 0.1925 |
| PSO | 1.0493 | 99.8506 | 3.6075 | 0.4788 | 0.8349 | 0.1497 |
| GSA | 1.1582 | 100.5012 | 4.9507 | 0.8082 | 0.9452 | 0.1321 |

Table 5 shows comparisons of Cohen's Kappa values of the edges detected using the BF algorithm with the improved techniques (IT) described herein against various conventional algorithms: Canny (shown in 802), Sobel, SUSAN, Edison, and NBFTED.

The comparison between each algorithm is made using a majority image derived from each of the listed conventional techniques. A pixel in the majority image is an edge pixel if the majority of the methods claim to have an edge pixel in its neighborhood, with at least one centered on it. In Table 5, the second column ("Majority") is the Cohen's Kappa value between the majority image using all five conventional algorithms listed above and the improved techniques using the algorithm corresponding to each row. The third column includes the Cohen's Kappa value between the majority image using all conventional algorithms listed above except the Canny algorithm and the Canny algorithm. The third column also includes the Cohen's Kappa value between the majority image using all conventional algorithms listed above except the Canny algorithm and the improved techniques using the algorithm corresponding to each row. The values in the fourth through the seventh columns are defined analogously.

A Cohen's Kappa value of 0.5 or higher gives rise to poor performance of an edge detector. As shown in Table 5, however, the improved techniques consistently provide a lower Cohen's Kappa value than the conventional approaches, sometimes significantly so. This would indicate that the improved techniques described herein provide much better edge detection performance than the conventional approaches. Nevertheless, the comparison between the improved techniques and the overall majority image shown in the second column indicates some inaccuracies. In this case, the Cameraman image may have some false edges.

Figure 9:
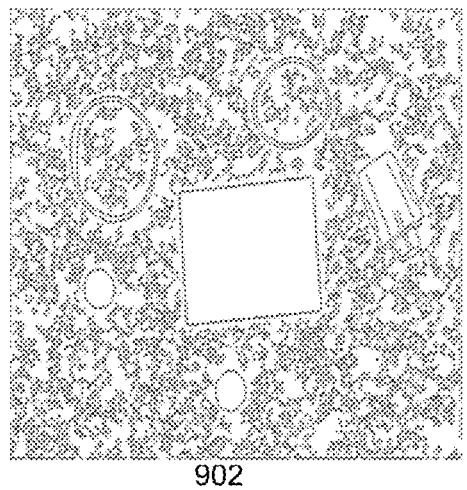
FIG. 9 is a diagram illustrating an example result of using one of the images in FIG. 6, compared with a result using a Canny algorithm.
Figure 9:
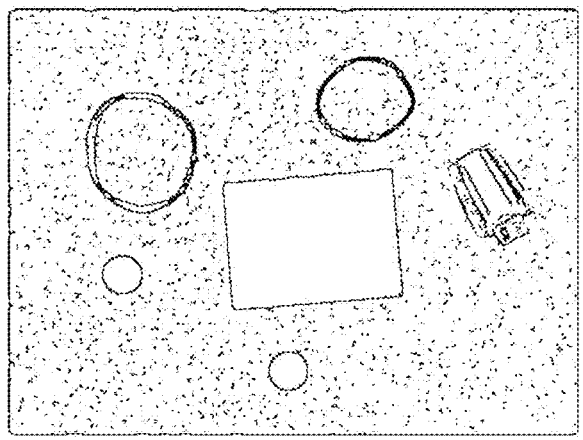
Figure 9:
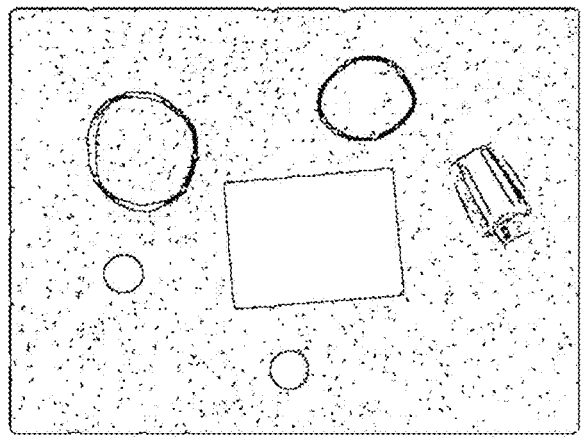
Figure 9:
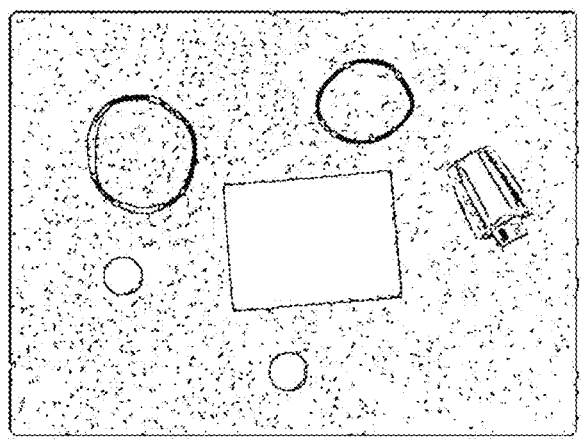
Figure 9:
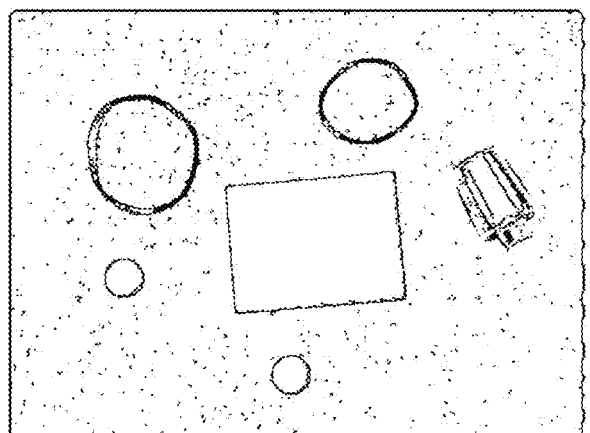

FIG. 9 is a diagram illustrating an example result of using the Pillset image 608 in FIG. 6, compared with conventional results. For example, the edge detection result 902 was generated using the Canny algorithm. The images in 904, 906, 908, and 910 were generated using the improved techniques described herein, with the Bacterial Foraging (BF), the Genetic Algorithm (GA), the Particle Swarm Optimization (PSO) algorithm, and the Gravitational Search Algorithm (GSA), respectively.

TABLE 5

Cohen's Kappa values between majority images of conventional edge detectors and the improved techniques described herein for the Cameraman image.

| Algorithm | Majority | Canny/IT | Sobel/IT | SUSAN/IT | Edison/IT | NBFTED/IT |
|---|---|---|---|---|---|---|
| BF | 0.522 | 0.347/0.327 | 0.358/0.341 | 0.425/0.419 | 0.485/0.390 | 0.517/0.430 |
| GA | 0.510 | 0.371/0.296 | 0.387/0.287 | 0.536/0.386 | 0.527/0.443 | 0.525/0.468 |
| PSO | 0.543 | 0.552/0.335 | 0.329/0.247 | 0.415/0.377 | 0.435/0.348 | 0.476/0.429 |
| GSA | 0.518 | 0.482/0.379 | 0.358/0.364 | 0.394/0.382 | 0.572/0.483 | 0.413/0.349 |

Table 6 shows optimized values of the parameters α, β, γ, a, and b as well as the optimal value of the figure of merit J for the Lena image.

TABLE 6

Optimized values of the parameters α, β, γ, a, and b as well as the optimal value of the merit J for the Pillset image

| Algorithm | α | β | γ | a | b | J |
|---|---|---|---|---|---|---|
| BF | 1.0985 | 100.0456 | 4.4500 | 0.4926 | 0.9996 | 0.0952 |
| GA | 0.8917 | 103.8763 | 3.5060 | 0.4097 | 0.8032 | 0.2101 |
| PSO | 0.9587 | 99.9911 | 4.3389 | 0.5246 | 0.8492 | 0.1833 |
| GSA | 0.5270 | 100.3716 | 5.8876 | 0.5964 | 0.9035 | 0.0773 |

Table 7 shows comparisons of Cohen's Kappa values of the edges detected using the BF algorithm with the improved techniques (IT) described herein against various conventional algorithms: Canny (shown in 902), Sobel, SUSAN, Edison, and NBFTED.

The comparison between each algorithm is made using a majority image derived from each of the listed conventional techniques. A pixel in the majority image is an edge pixel if the majority of the methods claim to have an edge pixel in its neighborhood, with at least one centered on it. In Table 7, the second column ("Majority") is the Cohen's Kappa value between the majority image using all five conventional algorithms listed above and the improved techniques using the algorithm corresponding to each row. The third column includes the Cohen's Kappa value between the majority image using all conventional algorithms listed above except the Canny algorithm and the Canny algorithm. The third column also includes the Cohen's Kappa value between the majority image using all conventional algorithms listed above except the Canny algorithm and the improved techniques using the algorithm corresponding to each row. The values in the fourth through the seventh columns are defined analogously.

TABLE 7

Cohen's Kappa values between majority images of conventional edge detectors and the improved techniques described herein for the Pillset image.

| Algorithm | Majority | Canny/IT | Sobel/IT | SUSAN/IT | Edison/IT | NBFTED/IT |
|---|---|---|---|---|---|---|
| BF | 0.459 | 0.585/0.349 | 0.382/0.374 | 0.514/0.350 | 0.413/0.365 | 0.472/0.401 |
| GA | 0.472 | 0.537/0.342 | 0.429/0.331 | 0.524/0.349 | 0.438/0.372 | 0.419/0.366 |
| PSO | 0.452 | 0.418/0.321 | 0.425/0.261 | 0.474/0.326 | 0.409/0.392 | 0.523/0.354 |
| GSA | 0.469 | 0.396/0.374 | 0.416/0.273 | 0.498/0.395 | 0.376/0.332 | 0.425/0.308 |

A Cohen's Kappa value of 0.5 or higher gives rise to poor performance of an edge detector. As shown in Table 7, however, the improved techniques consistently provide a lower Cohen's Kappa value than the conventional approaches, sometimes significantly so. This would indicate that the improved techniques described herein provide much better edge detection performance than the conventional approaches.

Figure 10:
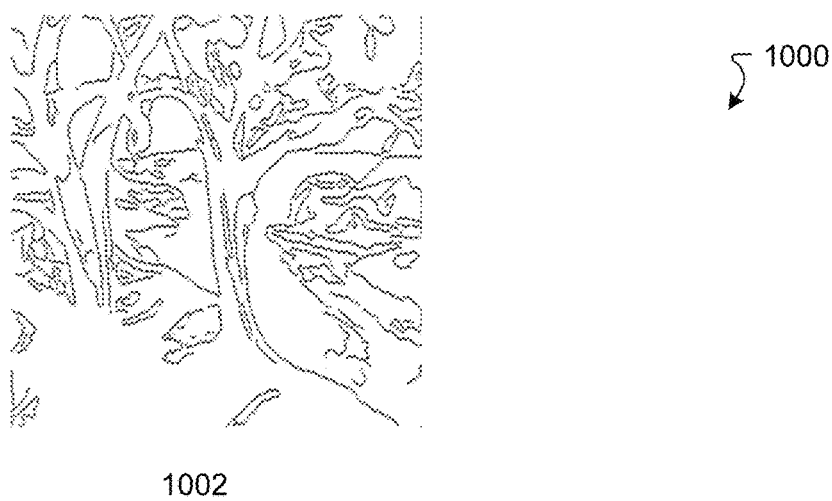
FIG. 10 is a diagram illustrating an example result of using one of the images in FIG. 6, compared with a result using a Canny algorithm.
Figure 10:
Figure 10:
Figure 10:
Figure 10:

FIG. 10 is a diagram illustrating an example result of using the Trees image 610 in FIG. 6, compared with conventional results. For example, the edge detection result 1002 was generated using the Canny algorithm. The images in 1004, 1006, 1008, and 1010 were generated using the improved techniques described herein, with the Bacterial Foraging (BF), the Genetic Algorithm (GA), the Particle Swarm Optimization (PSO) algorithm, and the Gravitational Search Algorithm (GSA), respectively.

Table 8 shows optimized values of the parameters α, β, γ, a, and b as well as the optimal value of the figure of merit J for the Lena image.

TABLE 8

Optimized values of the parameters α, β, γ, a, and b as well as the optimal value of the figure of merit J for the Trees image

| Algorithm | α | β | γ | a | b | J |
|---|---|---|---|---|---|---|
| BF | 1.0979 | 100.7604 | 3.8071 | 0.4750 | 0.9999 | 0.3951 |
| GA | 0.9012 | 102.1965 | 3.5095 | 0.4024 | 0.8012 | 0.4667 |
| PSO | 0.9952 | 99.8891 | 3.8839 | 0.4466 | 0.8286 | 0.4596 |
| GSA | 1.1161 | 99.4725 | 4.3165 | 0.6349 | 0.9879 | 0.4205 |

Table 9 shows comparisons of Cohen's Kappa values of the edges detected using the BF algorithm with the improved techniques (IT) described herein against various conventional algorithms: Canny (shown in 1002), Sobel, SUSAN, Edison, and NBFTED.

The comparison between each algorithm is made using a majority image derived from each of the listed conventional techniques. A pixel in the majority image is an edge pixel if the majority of the methods claim to have an edge pixel in its neighborhood, with at least one centered on it. In Table 9, the second column ("Majority") is the Cohen's Kappa value between the majority image using all five conventional algorithms listed above and the improved techniques using the algorithm corresponding to each row. The third column includes the Cohen's Kappa value between the majority image using all conventional algorithms listed above except the Canny algorithm and the Canny algorithm. The third column also includes the Cohen's Kappa value between the majority image using all conventional algorithms listed above except the Canny algorithm and the improved techniques using the algorithm corresponding to each row. The values in the fourth through the seventh columns are defined analogously.

TABLE 9

Cohen's Kappa values between majority images of conventional edge detectors and the improved techniques described herein for the Trees image.

| Algorithm | Majority | Canny/IT | Sobel/IT | SUSAN/IT | Edison/IT | NBFTED/IT |
|---|---|---|---|---|---|---|
| BF | 0.436 | 0.375/0.310 | 0.420/0.375 | 0.377/0.321 | 0.428/0.324 | 0.398/0.325 |
| GA | 0.434 | 0.612/0.346 | 0.345/0.306 | 0.381/0.338 | 0.393/0.385 | 0.378/0.332 |
| PSO | 0.446 | 0.469/0.283 | 0.437/0.352 | 0.403/0.345 | 0.445/0.423 | 0.497/0.450 |
| GSA | 0.485 | 0.527/0.406 | 0.484/0.383 | 0.391/0.340 | 0.437/0.351 | 0.392/0.315 |

A Cohen's Kappa value of 0.5 or higher gives rise to poor performance of an edge detector. As shown in Table 9, however, the improved techniques consistently provide a lower Cohen's Kappa value than the conventional approaches, sometimes significantly so. This would indicate that the improved techniques described herein provide much better edge detection performance than the conventional approaches.

Table 10 shows the values of the Shannon entropy for the conventional edge detectors and the improved techniques using the four optimization algorithms. A very large value of entropy reflects larger noise content or double edges. The Canny and Edison edge detectors produce double edges and SUSAN methods produce larger noise content, therefore the entropy values with these methods are higher than those with the proposed method. The other edge detectors namely Sobel and NBFTED give less edge information. Accordingly, the entropy values using these methods are inferior to those of the improved techniques.

Table 11 shows execution times for edge detection using the four optimization algorithms described herein for the four images used above.

TABLE 11

Execution times for edge detection for each of the images using each of the optimization algorithms in the improved techniques.

| Test Image | BF | GA | PSO | GSA |
|---|---|---|---|---|
| Lena | 68.37 | 20.70 | 20.91 | 21.40 |
| Cameraman | 79.43 | 20.74 | 20.22 | 21.34 |
| Pillset | 57.06 | 15.79 | 15.93 | 15.87 |
| Trees | 35.82 | 7.50 | 7.71 | 8.01 |

A number of embodiments have been described. Nevertheless, it will be understood that various modifications may be made without departing from the spirit and scope of the specification.

It will also be understood that when an element is referred to as being on, connected to, electrically connected to, coupled to, or electrically coupled to another element, it may be directly on, connected or coupled to the other element, or one or more intervening elements may be present. In contrast, when an element is referred to as being directly on, directly connected to or directly coupled to another element, there are no intervening elements present. Although the terms directly on, directly connected to, or directly coupled to may not be used throughout the detailed description, elements that are shown as being directly on, directly connected or directly coupled can be referred to as such. The claims of the application may be amended to recite exemplary relationships described in the specification or shown in the figures.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the implementations. It should be understood that they have been presented by way of example only, not limitation, and various changes in form and details may be made. Any

TABLE 10

Values of the Shannon entropy for the edge detectors discussed above.

| Test Image | Canny | Sobel | SUSAN | Edison | NBFTED | Proposed Method (BF) | Proposed Method (GA) | Proposed Method (PSO) | Proposed Method (GSA) |
|---|---|---|---|---|---|---|---|---|---|
| Lena | 0.9824 | 0.5946 | 1.0519 | 0.7851 | 0.7146 | 0.7368 | 0.7207 | 0.7341 | 0.7395 |
| Cameraman | 0.7780 | 0.4084 | 1.0119 | 0.6941 | 0.5712 | 0.6164 | 0.5664 | 0.5981 | 0.6125 |
| Pillset | 1.4212 | 0.2265 | 1.1692 | 0.7854 | 0.7903 | 0.7849 | 0.7801 | 0.7836 | 0.7823 |
| Trees | 0.9109 | 0.5791 | 1.7299 | 0.8682 | 0.8682 | 0.8746 | 0.8715 | 0.8703 | 0.8716 | portion of the apparatus and/or methods described herein may be combined in any combination, except mutually exclusive combinations. The implementations described herein can include various combinations and/or sub-combinations of the functions, components and/or features of the different implementations described.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

APPENDIX

The following is a description of each of the optimization algorithms used herein.

A. Bacterial Foraging

Foraging can be modeled as an optimization process where bacteria seek to minimize the effort spent per unit time in foraging. In this scheme, an objective function is posed as the effort or a cost incurred by the bacteria in search of food. A set of bacteria tries to reach an optimum cost by following four stages such as chemotaxis, swarming, reproduction, and elimination and dispersal. There will be as many solutions as the number of bacteria. However, to arrive at an optimum path in the minimum time (i.e., convergence of solution path), we must have a sufficient number of bacteria. The bacteria have to follow four steps in the course of foraging.

In the chemotaxis stage, the bacteria either resort to a tumble followed by a tumble or make a tumble followed by a run or swim. On the other hand, in swarming, each *E. coli* bacterium signals another via attractants to swarm together. Furthermore, the least healthy bacteria die during the reproduction, whereas each of the healthiest bacteria splits into two, which are placed at the same location. While in the elimination and dispersal stage, any bacterium from the total set can be either eliminated or dispersed to a random location during the optimization. This stage helps the bacteria avoid the local optimum. Out of many bacteria engaged in foraging (several solution paths), some come out successful in achieving an optimum cost (an optimum solution).

Let $\theta$ be the position of a bacterium and $J(\theta)$ be a function of representing the value of the objective function; then, the conditions $J(\theta)<0, J(\theta)=0$, and $J(\theta)>0$ indicate whether the bacterium at location $\theta$ is in nutrient-rich, neutral, and noxious environments, respectively. Basically a chemotaxis is a foraging behavior that implements a type of optimization.

Here, bacteria climb up the nutrient concentration (find the lower values of $J(\theta)$), avoid the noxious substances, and search for ways out of neutral media (avoid being at positions $\theta$ where $J(\theta) \geq 0$).

The four basic iterative steps of BF optimization are described below:

1) Chemotaxis: This step consists of a tumble followed by a tumble or a tumble followed by a run. Let j be the index of the chemotactic step, k be the index of the reproduction step, and l be the index of elimination-dispersal event. Suppose that the position of each member in the population of bacteria $N_b$ at the $j^{th}$ chemotactic step, $k^{th}$ reproduction step, and $l^{th}$ elimination-dispersal event be given by $P(j,k,l) = \{\theta^i(j,k,l); i=1,2,\ldots,N_b\}$. Instead of $J(\theta)$, we consider $J(i,\theta^i(j,k,l))$ or simply $J(i,j,k,l)$ as the cost at the location of the $i^{th}$ bacterium $\theta^i(j,k,l) \in \mathbb{R}_p$ (a space of real values of p) and $N_c$ to be the length of the lifetime of the bacteria as measured by the number of chemotactic steps. To represent a tumble, a unit length in the random direction, e.g., $\varphi(j)$, is generated.

In particular, we take:

$$\theta^i(j+1,k,l) = \theta^i(j,k,l) + D(i)\varphi(j)$$

so that $D(i)>0, i=1, 2, \ldots, N_b$, is the size of the step made in the random direction specified by the tumble.

If at $\theta^i(j+1,k+1,l)$, the cost $J(i,j+1,k,l)$ is better (lower) than that at $\theta^i(j,k,l)$, then another step of size $D(i)$ will be made in the same direction. This movement, called swim, can be made in either direction in contrast to a tumble. It is continued until the cost is reduced but limiting the maximum number of steps Ns.

2) Swarming: As part of this task, the bacteria following the optimum path of food try to attract other bacteria so that together they more rapidly reach the desired location. The effect of swarming is to introduce an additional cost in $J(i,j,k,l)$.

3) Reproduction: For reproduction, the population is sorted in the ascending order of accumulated food so that out of the total number of bacteria $N_b$, the least healthy bacteria $N_{br}$ die and the healthiest bacteria $N_{br}$ reproduce (split into two) with no mutations. Note that $N_{br}=N_b/2$, and let $N_{re}$ be the number of reproduction steps.

4) Elimination and dispersal: This step helps reduce the behavior of stagnation (i.e., being trapped in a premature solution point or local optima). Each bacterium in the population undergoes this event with probability $p_{ed}$, and let $N_{ed}$ be the number of these events.

The initial values of the parameters of modified BF algorithm are set as follows:

1) The number of bacteria $S=8$
2) The swimming length $N_s=2$
3) The number of iterations in a chemotactic loop $N_c=4$ ($N_c>N_s$)
4) The number of reproduction steps $N_{re}=4$
5) The number of elimination and dispersal events $N_{ed}=3$
6) The probability of elimination/dispersal $p_{ed}=0.26$ B. Genetic Algorithm Genetic Algorithms are a family of computational models inspired by evolution. It is a global optimization method that manipulates a string of numbers in a manner similar to how chromosomes are changed in biological evolution. It solves a minimization problem by first converting it into a maximization problem and finds global maxima. An initial population made up of strings of numbers is chosen at random or is specified by the user. Each string of numbers is called a "chromosome" or an "individual," and each number slot is called a "gene." A set of chromosomes forms a population. Each chromosome represents a given number of traits which are the actual parameters that are being varied to optimize the "fitness function". The fitness/objective function is a performance index that we seek to maximize.

The operation of the GA proceeds in steps. Beginning with the initial population, "selection" is used to choose which chromosomes should survive to form a "mating pool." Chromosomes are chosen based on how fit they are (as computed by the fitness function) relative to the other members of the population. More fit individuals end up with more copies of themselves in the mating pool so that they will more significantly affect the formation of the next generation. Next, several operations are taken on the mating pool. "Crossover" (which represents mating, the exchange of genetic material) occurs between parents. To perform crossover, a random spot is picked in the chromosome, and the genes after this spot are switched with the corresponding genes of the other parent. Following this, "mutation" occurs. This is where some genes are randomly changed to other values. After the crossover and mutation operations occur, the resulting strings form the next generation and the process is repeated. A termination criterion is used to specify when the GA should end (e.g., the maximum number of generations or until the fitness stops increasing).

The initial values of the parameters of GA are set as follows:
1) Number of individuals in the population pop_size=25
2) Number of traits in each individual num_traits=2
3) Maximum number of generations max_generation=1000
4) Probability of crossover cross_prob=0.6
5) Probability of mutation mutat_prob=0.02

C. Particle Swarm Optimization

The technique generates a set of relevant solutions called population and then finds an optimal solution through searching and updating the past history of the particles of the population. It is influenced by cognitive and social behavior of the swarms. Each particle has some velocity according to which it moves in the multi-dimensional space. Each particle also has memory to keep information of its previously visited space. The PSO algorithm is guided by two factors: Movement of the particle in local neighborhood as well as in global neighborhood.

There are two types of solutions obtained using PSO:
1. Local Best Solutions are the best solutions due to particle itself searching for the best solution in the restricted swarm.
2. Global Best Solution is the best solution due to all the particles participating in the solution space.

Local and global best positions are updated only if better solution is found for each iteration. The various notations involved in the PSO algorithm are:

i) Position of the ith Particle:
$X_i=(X_{i1}, X_{i2}, \ldots, X_{iN})$ is the $i^{th}$ particle of the swarm. Here, the first subscript denotes the particle number and the second subscript denotes the dimension.

ii) Velocity of the $i^{th}$ Particle:

$$V_i=(V_{i1}, V_{i2}, \ldots, V_{iN})$$

iii) Local Best Position $X_{best}$ of the Swarm:

$$X_{best}=(P_{i1}, P_{i2}, \ldots, P_{iN})$$

iv) Velocity Update:

$$V_{id}^{(k+1)}=\omega * V_{id}^{(k)} + \gamma_1 * \alpha (X_{bestid} - X_{id}^{(k)}) + \gamma_2 * \beta (g_{best} - X_{id}^{(k)})$$

where: $i=(1,2, \ldots, m)$ is the number of swarms, $d=(1,2, \ldots, N)$ is the dimension of the objective function to be optimized, $g_{best}$ is the global best solution of the swarm, k is the iteration number, $\omega$ is the inertia weight to control the previous velocity vector of the swarm on the new one. It is a tradeoff between global and local exploration and helps in reducing the number of iterations for searching an optimal solution. $\gamma_1$ and $\gamma_2$ are random numbers between 0 and 1, $\alpha$ is called the cognitive parameter, and $\beta$ is called the social parameter. Generally, $\alpha+\beta \leq 4$ and by default, $\alpha=\beta=\mathbf{2}$.

v) Position Update:

$$X_{id}^{(k+1)}=X_{id}^{(k)}+V_{id}^{(k+1)}/q$$

where q is the correction factor (optional) to speed up the convergence process.

The initial values of the parameters of PSO are set as follows:
1) The number of swarms swarm_size=20
2) Maximum number of iterations itr=50
3) Inertia weight $\omega=1.0$
4) Cognitive parameter $\alpha=2$
5) Social parameter $\beta=2$
6) Parameters $\gamma_1$ and $\gamma_2$ are generated randomly in the interval [0-1]
7) Correction factor q=1.3

D. Gravitational Search Algorithm

It is an evolutionary algorithm based on the physical law of gravity and the law of motion. The law of gravity states that every particle in the universe attracts every other particle with a force that is directly proportional to the product of their masses and inversely proportional to the square of the distance between them. In this method, agents are objects whose performance is dependent on their masses. All the objects attract each other by the gravity force. Therefore, all objects are pulled towards the objects with heavier masses, just as it happens in the nature.

Suppose there is a system with N agents, the position of every agent is a point in the search space which represents a solution to the problem. The position of the $i^{th}$ agent is defined as follows:

$$X_i=(x_i^1, \ldots, x_i^d, \ldots, x_i^n) i=1,2,\ldots,N$$

where n is the dimension of the problem, and $x_i^d$ is the position of the $i^{th}$ agent in the $d^{th}$ dimension.

At the starting point of the solution the agents are situated randomly. At the specific time t a gravitational force from mass j acts on mass i, and is defined as follows:

$$F_{ij}^d(t) = G(t)\frac{M_i(t) \times M_j(t)}{R_{ij}(t)+\varepsilon}(x_j^d(t) - x_i^d(t))$$

where, $M_i$ is the mass of the object i, $M_j$ is the mass of the object j, $G(t)$ is the gravitational constant at time t, $R_{ij}(t)$ is the Euclidian distance between the two objects i and j, and $\varepsilon$ is a small constant.

The gravitational constant, G, which is initialized randomly, decreases by time to control the search accuracy. In other words, G is a function of the initial value (G0) and time (t):

$$G(t)=G(G0,t)$$

The total force acting on agent i in the dimension d is calculated as follows:

$$F_i^d(t) = \sum_{j \in kbest, j \neq i} rand_j F_{ij}^d(t)$$

where r and j is a random number in the interval [0,1] and is used to give a randomized characteristics to the search.

According to the law of motion, the acceleration of the agent i at time t, in the $d^{th}$ dimension is directly proportional to the force acting on that agent, and inversely proportional to the mass of the agent:

$$a_i^d(t) = \frac{F_i^d(t)}{M_i(t)}$$

Furthermore, the next velocity of an agent is a function of its current velocity added to its current acceleration. Therefore, the next position and the next velocity of an agent can be calculated as follows:

$$v_i^d(t+1) = \text{rand}_i v_i^d(t) + a_i^d(t)$$

$$x_i^d(t+1) = x_i^d(t) + v_i^d(t+1)$$

The masses of the agents are calculated using fitness evaluation. The heavier the mass of an agent, the more efficient is that agent, regarding the solution it represents. It is notable that as the law of gravity and the law of motion imply, a heavy mass has a higher attraction power and moves more slowly.

The masses are updated as follows:

$$m_i(t) = \frac{fit_i(t) - \text{worst}(t)}{\text{best}(t) - \text{worst}(t)}$$

where $fit_i(t)$ represents the fitness value of the agent i at time t, and the best(t) and worst(t) in the population respectively indicate the strongest and the weakest agent according to their fitness route. For a minimization problem, best(t) and worst(t) can be defined as follows:

$$\text{best}(t) = \min_{j \in \{1,\ldots,N\}} fit_j(t)$$

$$\text{worst}(t) = \min_{j \in \{1,\ldots,N\}} fit_j(t)$$

The updated masses must be normalized using the following equation:

$$M_i(t) = \frac{m_i(t)}{\sum_{j=1}^{N} m_j(t)}$$

At the beginning of the system establishment, every agent is located at a certain point of the search space which represents a solution to the problem at every unit of time. The agents are evaluated and their next positions are calculated. The search can be stopped after a certain amount of time.

GSA can be considered as a population-based heuristic algorithm, in which the two common aspects are exploration and exploitation. The exploration is the ability to navigate through the whole search space and the exploitation is the ability to find the optima around a good solution. GSA, like many other population-based search algorithms provide satisfactory results. However, the results can be considered much more efficient in terms of speed. The exploration step can be guaranteed by choosing proper values for the random parameters in the equations mentioned earlier, and exploitation step is taken care of when the objects with heavier masses start to move more and more slowly.

The initial values of the parameters of GSA are set as follows:
1) The number of agents N=40
2) Maximum number of iterations max_it=20

Comparison of different evolutionary algorithms in terms of their parameters indicates that crossover and mutation operators used in GA are not involved in BF, PSO and GSA. The biological thing is called as bacterium in BF, chromosome in GA, swarm in PSO and agent in GSA. Termination criterion for the various evolutionary algorithms is: maximum number of iterations=(S*Nc*Nre*Ned) for BF, maximum number of generations for GA, maximum number of iterations for PSO and GSA. From experimentation, it is noticed that a considerable saving in computation time is possible by reducing the number of iterations but not at the cost of sacrificing the edge quality. The computation time also varies according to the image size.

What is claimed is:

1. A computer-implemented method for producing edges of an object in an image, comprising:
    receiving image data representing a plurality of pixels of the image, each of the plurality of pixels including a brightness value;
    generating gradient matrix data representing a gradient matrix having elements, each element of the gradient matrix corresponding to a respective pixel of the plurality of pixels and including a gradient of the brightness value of the pixel;
    generating membership function data representing a membership function matrix having elements, each element of the membership function matrix including a sigmoidal function of a respective element of the gradient matrix, the generating the membership function data includes performing a smoothing operation on the gradient matrix data to produce smoothed gradient matrix data representing a smoothed gradient matrix having elements, each element of the smoothed gradient matrix including a smoothing function of a respective element of the gradient matrix; and
    performing an adaptive threshold operation on the membership function data to produce the edges of the object in the image, the adaptive threshold operation including generating a local threshold corresponding to a subset of the plurality of pixels of the image, the local threshold being based on the brightness values of the pixels of the subset of the plurality of pixels of the image;
    wherein the adaptive threshold operation on the membership function data is performed on the smoothed gradient matrix data.

2. The method of claim 1, wherein the smoothing function of an element of the gradient matrix includes a power of a square of a ratio of a difference between (i) the element of the gradient matrix and a first parameter and (ii) a second parameter, the power and the first and second parameters being fixed numbers independent of the pixel of the plurality of pixels to which the element corresponds.

3. The method of claim 1, wherein the sigmoidal function of an element of the gradient matrix is a linear ramp between a lower value and an upper value when the gradient of the brightness value of the pixel to which the element corresponds has a value between a lower fuzzy value and an upper fuzzy value.

4. The method of claim 1, wherein the sigmoidal function of an element of the gradient matrix is based on a set of parameters, each of the set of parameters being determined by optimizing a figure of merit, the figure of merit being based on the sigmoidal membership function.

5. The method of claim 4, wherein the figure of merit is a difference between a fuzzy entropy determined from the sigmoidal membership function and a specified value of the fuzzy entropy.

6. The method of claim 4, wherein optimizing the figure of merit includes:
    inputting the figure of merit into a derivative-free optimization algorithm for which an output includes values of the set of parameters.

7. A computer program product comprising a nontransitory storage medium, the computer program product including code that, when executed by processing circuitry of a computer configured to produce edges of an object in an image, cause the computer to perform a method, the method comprising:
   receiving image data representing a plurality of pixels of the image, each of the plurality of pixels including a brightness value;
   generating gradient matrix data representing a gradient matrix having elements, each element of the gradient matrix corresponding to a respective pixel of the plurality of pixels and including a gradient of the brightness value of the pixel;
   generating membership function data representing a membership function matrix having elements, each element of the membership function matrix including a sigmoidal function of a respective element of the gradient matrix, the generating the membership function data includes performing a smoothing operation on the gradient matrix data to produce smoothed gradient matrix data representing a smoothed gradient matrix having elements, each element of the smoothed gradient matrix including a smoothing function of a respective element of the gradient matrix; and
   performing an adaptive threshold operation on the membership function data to produce the edges of the object in the image, the adaptive threshold operation including generating a local threshold corresponding to a subset of the plurality of pixels of the image, the local threshold being based on the brightness values of the pixels of the subset of the plurality of pixels of the image;
   wherein the adaptive threshold operation on the membership function data is performed on the smoothed gradient matrix data.

8. The computer program product of claim 7, wherein the gradient of the brightness value of a pixel is a net difference between the brightness at neighboring pixels in one of a plurality of directions, the plurality of directions including north, east, south, west, northeast, northwest, southeast, and southwest.

9. The computer program product of claim 8, wherein the net difference between the brightness at neighboring pixels in a direction of the plurality of directions is generated from a plurality of differences in that direction according to a set of rules corresponding to that direction.

10. The computer program product of claim 9, wherein the set of rules corresponding to a direction includes a rule setting, as the net difference in that direction, a maximum difference of the plurality of differences in that direction.

11. The computer program product of claim 8, wherein generating the gradient matrix data includes:
   setting, as the net difference between the brightness at neighboring pixels in one of a plurality of directions, a median of differences between the brightness at neighboring pixels in the plurality of directions.

12. The computer program product of claim 8, wherein generating the gradient matrix data includes:
   generating additional padded brightness values outside of a boundary of the image, the additional padded brightness values producing gradients of the brightness value of the pixel at the boundary of the image.

13. An electronic apparatus configured to produce edges of an object in an image, the electronic apparatus comprising:
   a network interface;
   a memory; and
   controlling circuitry coupled to the memory, the controlling circuitry being configured to:
      receive image data representing a plurality of pixels of the image, each of the plurality of pixels including a brightness value;
      generate gradient matrix data representing a gradient matrix having elements, each element of the gradient matrix corresponding to a respective pixel of the plurality of pixels and including a gradient of the brightness value of the pixel;
      generate membership function data representing a membership function matrix having elements, each element of the membership function matrix including a sigmoidal function of a respective element of the gradient matrix, the controlling circuitry configured to generate the membership function data is further configured to perform a smoothing operation on the gradient matrix data to produce smoothed gradient matrix data representing a smoothed gradient matrix having elements, each element of the smoothed gradient matrix including a smoothing function of a respective element of the gradient matrix; and
      perform an adaptive threshold operation on the membership function data to produce the edges of the object in the image, the adaptive threshold operation including generating a local threshold corresponding to a subset of the plurality of pixels of the image, the local threshold being based on the brightness values of the pixels of the subset of the plurality of pixels of the image;
      wherein the adaptive threshold operation on the membership function data is performed on the smoothed gradient matrix data.

14. The electronic apparatus of claim 13, wherein the smoothing function of an element of the gradient matrix includes a power of a square of a ratio of a difference between (i) the element of the gradient matrix and a first parameter and (ii) a second parameter, the power and the first and second parameters being fixed numbers independent of the pixel of the plurality of pixels to which the element corresponds.

15. The electronic apparatus of claim 13, wherein the sigmoidal function of an element of the gradient matrix is a linear ramp between a lower value and an upper value when the gradient of the brightness value of the pixel to which the element corresponds has a value between a lower fuzzy value and an upper fuzzy value.

16. The electronic apparatus of claim 13, wherein the sigmoidal function of an element of the gradient matrix is based on a set of parameters, each of the set of parameters being determined by optimizing a figure of merit, the figure of merit being based on the sigmoidal membership function.

17. The electronic apparatus of claim 16, wherein the figure of merit is a difference between a fuzzy entropy determined from the sigmoidal membership function and a specified value of the fuzzy entropy.

18. The electronic apparatus of claim 16, wherein the controlling circuitry configured to optimize the figure of merit is further configured to:
   input the figure of merit into a derivative-free optimization algorithm for which an output includes values of the set of parameters.

19. The method of claim 1, wherein performing the adaptive threshold operation on the membership function data further includes:

computing a ratio of a median to a mean of a minimum value and a maximum value of the brightness values of the pixels of the subset of the plurality of pixels of the image.

\* \* \* \* \*